(12) United States Patent
Barathi

(10) Patent No.: US 12,174,859 B2
(45) Date of Patent: Dec. 24, 2024

(54) METHOD, APPARATUS, AND SYSTEM FOR MACHINE LEARNING-BASED PERSISTENCE FILTERING

(71) Applicant: HERE Global B.V., Eindhoven (NL)

(72) Inventor: Sarath Kumar Barathi, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 851 days.

(21) Appl. No.: 17/075,356

(22) Filed: Oct. 20, 2020

(65) Prior Publication Data

US 2022/0121691 A1 Apr. 21, 2022

(51) Int. Cl.
*G06F 16/29* (2019.01)
*G06F 16/23* (2019.01)
*G06N 3/047* (2023.01)
*G06N 3/048* (2023.01)
*G06N 20/00* (2019.01)
*G07C 5/00* (2006.01)

(52) U.S. Cl.
CPC .............. *G06F 16/29* (2019.01); *G06F 16/23* (2019.01); *G06N 3/047* (2023.01); *G06N 3/048* (2023.01); *G06N 20/00* (2019.01); *G07C 5/008* (2013.01)

(58) Field of Classification Search
None
See application file for complete search history.

(56) References Cited

U.S. PATENT DOCUMENTS

| | | | |
|---|---|---|---|
| 9,665,100 | B2 | 5/2017 | Shashua et al. |
| 2016/0170414 | A1* | 6/2016 | Chen .................. G06F 18/2453 701/27 |
| 2018/0053108 | A1 | 2/2018 | Olabiyi et al. |
| 2018/0188037 | A1 | 7/2018 | Wheeler et al. |
| 2019/0051153 | A1* | 2/2019 | Giurgiu ............. G01C 21/3691 |
| 2020/0004259 | A1* | 1/2020 | Gulino .................... G06F 18/00 |

(Continued)

OTHER PUBLICATIONS

Ralf C. Staudemeyer and Eric Rothstein Morris. Understanding LSTEM—a tutorial into Long Short-Term Memory Recurrent Neural Networks, Sep. 2019. (Year: 2019).*

(Continued)

*Primary Examiner* — Aniss Chad
*Assistant Examiner* — Mahmoud M Kazimi

(57) ABSTRACT

An approach is provided for map updates using a machine learning-based persistence filter. The approach involves, for example, processing sensor data collected from vehicles to determine positive observations and/or negative observations of a map or geographic feature. The method also comprises providing the positive and/or observations as an input sequence to a machine learning model. The machine learning model, for instance, includes an input layer that feeds the input sequence to a long short-term memory (LSTM) layer or other type of recurrent neural network (RNN) layer. The LSTM or RNN layer connects to a fully connected layer and then to an output layer. The output layer outputs a predicted sequence of positive and/or negative observations. The method further comprises initiating an update of a geographic database to add, remove, or update the geographic feature based on the predicted sequence.

16 Claims, 22 Drawing Sheets

(56) References Cited

U.S. PATENT DOCUMENTS

2021/0334656 A1\* 10/2021 Sjögren ................ G06N 3/0455
2022/0319164 A1\* 10/2022 Jaitly ...................... G06N 3/08

OTHER PUBLICATIONS

Wei et al., "Predicting Fine-grained Traffic Conditions via Spatio-temporal LSTM", Wireless Communications and Mobile Computing, vol. 2019, Article ID 9242598, Published Jan. 14, 2019, 12 pages.

\* cited by examiner

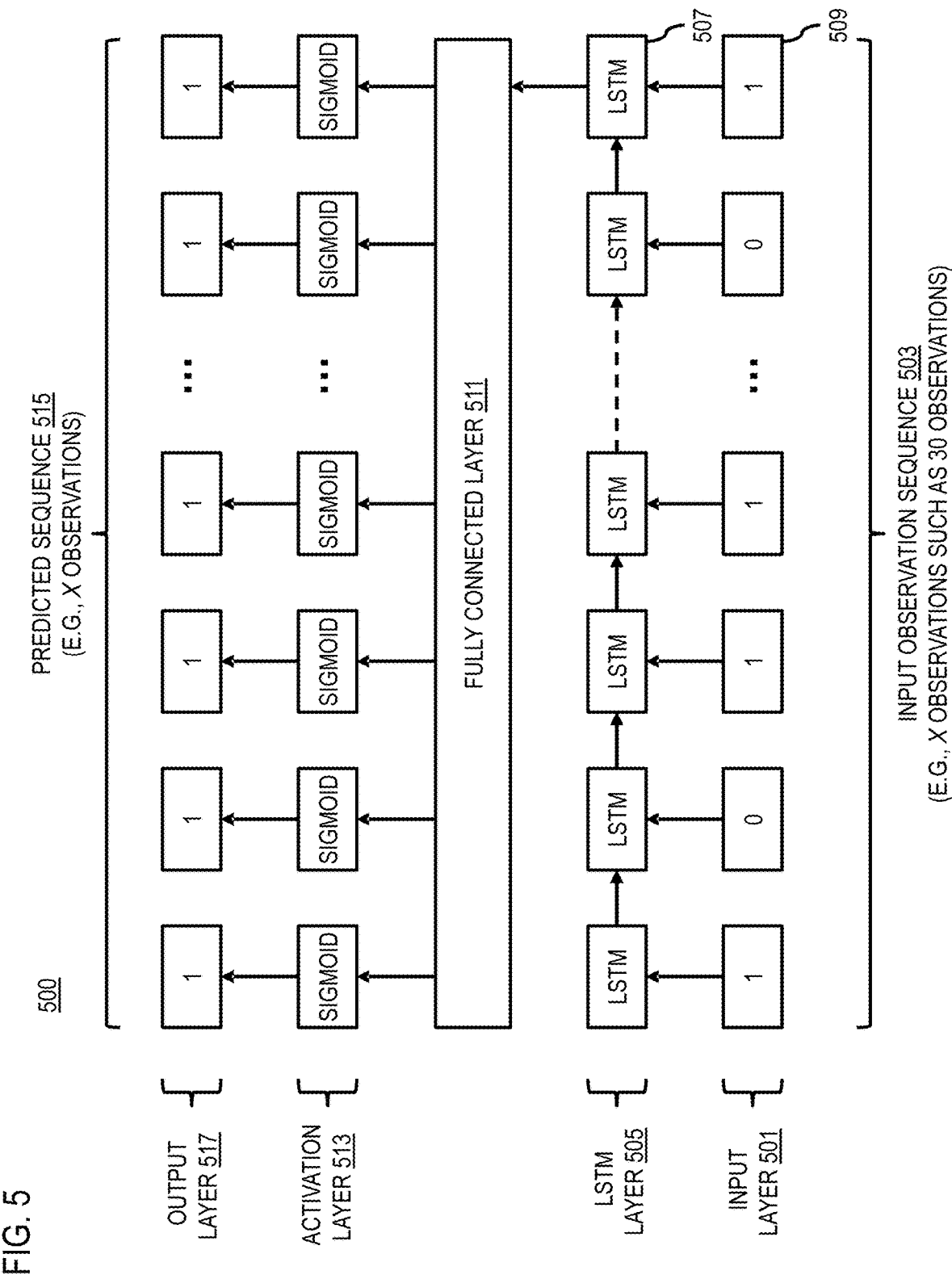

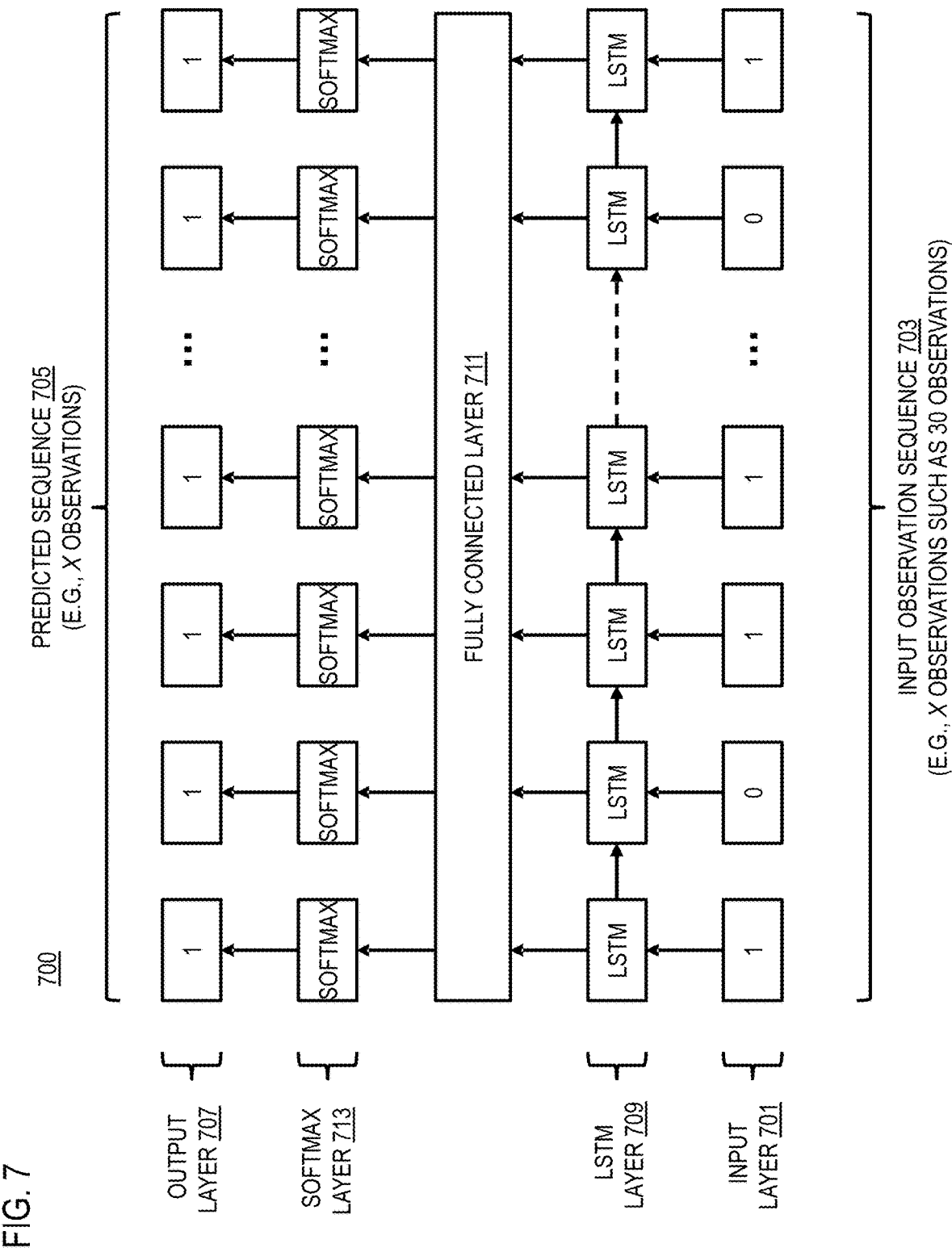

METHOD, APPARATUS, AND SYSTEM FOR MACHINE LEARNING-BASED PERSISTENCE FILTERING

BACKGROUND

Advances in computer vision systems and feature detectors (e.g., machine learning based feature detectors such as neural networks) are leading to accelerated development of autonomous driving and related mapping/navigation services. For example, such computer vision systems can be used to detect and recognize road features (e.g., traffic or other road signs) to improve digital map updates or other related mapping/navigation functions. In many cases, traffic signs and the information they provide (e.g., vehicle speed limits, etc.) can be important for the safe operation of road vehicles, but they may also undergo constant change (e.g., new signs may be added, old signs may be removed, existing signs may be updated, etc.). Consequently, service providers face significant technical challenges to updating digital map data to ensure a high level of accuracy.

SOME EXAMPLE EMBODIMENTS

Therefore, there is a need for an approach for efficient and accurate means of processing sensor data to determine changes to existing geographic features, e.g., to update digital map data.

According to one embodiment, a computer-implemented method comprises processing sensor data collected from a plurality of vehicles to determine one or more positive observations, one or more negative observations, or a combination thereof of a geographic feature. The method also comprises providing the one or more positive observations, the one or more negative observations, or a combination thereof as an input sequence to a machine learning model. The machine learning model, for instance, includes an input layer that feeds the input sequence to a long short-term memory (LSTM) layer or any other type of recurrent neural network (RNN) layer. The LSTM layer or other RNN layer connects to a fully connected layer and then to an output layer. The output layer outputs a predicted sequence of the one or more positive observations, the one or more negative observations, or a combination thereof. The method further comprises initiating an update of a geographic database to add, remove, or update the geographic feature based on the predicted sequence.

According to another embodiment, an apparatus comprises at least one processor, and at least one memory including computer program code for one or more computer programs, the at least one memory and the computer program code configured to, with the at least one processor, cause, at least in part, the apparatus to process sensor data collected from a plurality of vehicles to determine one or more positive observations, one or more negative observations, or a combination thereof of a geographic feature. The method also comprises providing the one or more positive observations, the one or more negative observations, or a combination thereof as an input sequence to a machine learning model. The machine learning model, for instance, includes an input layer that feeds the input sequence to an LSTM layer or any other type of RNN layer. The LSTM layer or other RNN layer connects to a fully connected layer and then to an output layer. The output layer outputs a predicted sequence of the one or more positive observations, the one or more negative observations, or a combination thereof. The method further comprises initiating an update of a geographic database to add, remove, or update the geographic feature based on the predicted sequence.

According to another embodiment, a non-transitory computer-readable storage carries one or more sequences of one or more instructions which, when executed by one or more processors, cause, at least in part, an apparatus to According to another embodiment, an apparatus comprises means for processing sensor data collected from a plurality of vehicles to determine one or more positive observations, one or more negative observations, or a combination thereof of a geographic feature. The method also comprises providing the one or more positive observations, the one or more negative observations, or a combination thereof as an input sequence to a machine learning model. The machine learning model, for instance, includes an input layer that feeds the input sequence to an LSTM layer or any other type of RNN layer. The LSTM layer or other RNN layer connects to a fully connected layer and then to an output layer. The output layer outputs a predicted sequence of the one or more positive observations, the one or more negative observations, or a combination thereof. The method further comprises initiating an update of a geographic database to add, remove, or update the geographic feature based on the predicted sequence.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 is a diagram illustrating a first example LSTM architecture for a machine learning-based persistence filter, according to one embodiment;

FIG. 7 is a diagram illustrating a second example LSTM architecture for a machine learning-based persistence filter, according to one embodiment;

DESCRIPTION OF SOME EMBODIMENTS

Examples of a method, apparatus, and computer program for machine-learning based persistence filtering are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
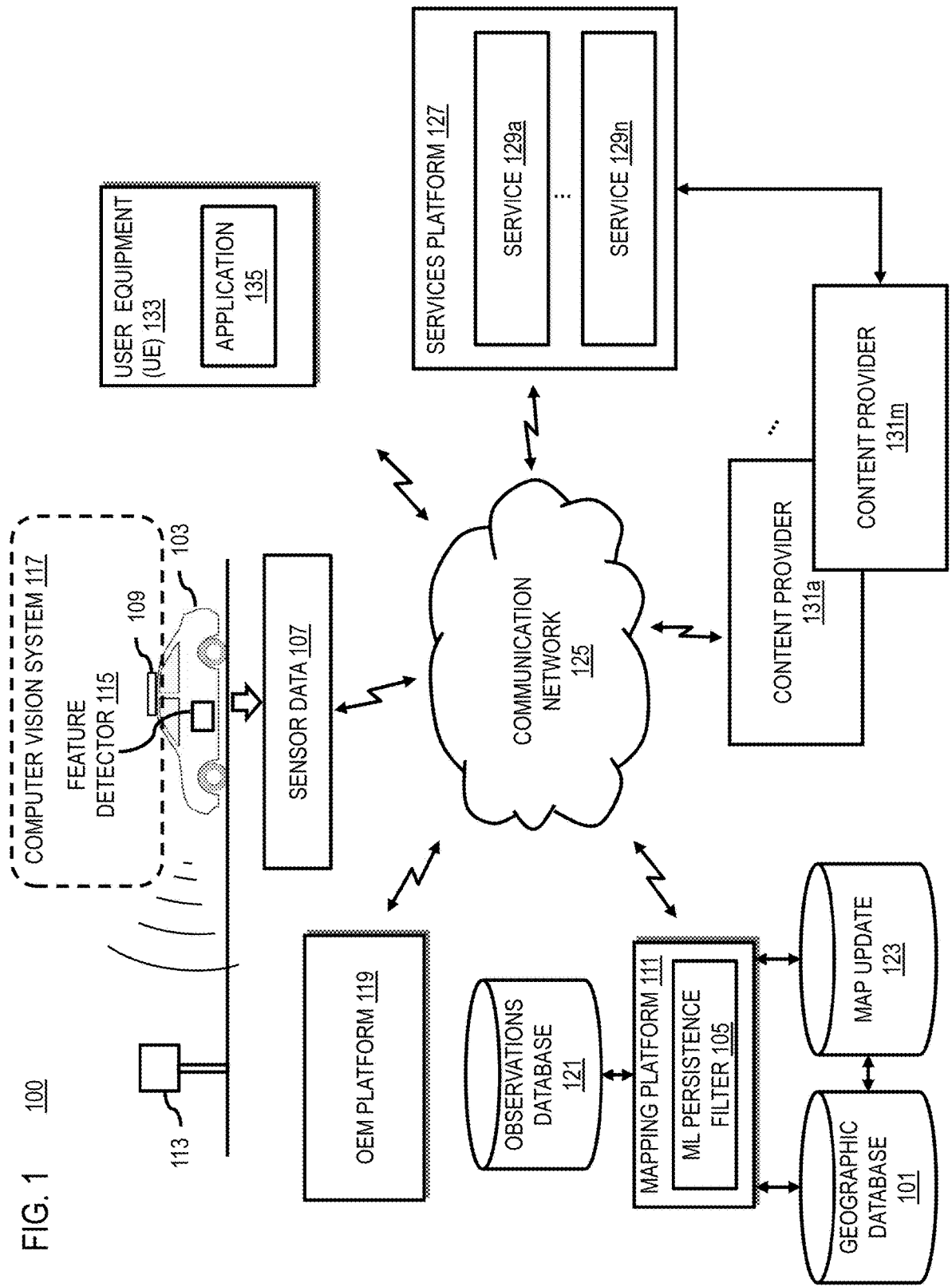
FIG. 1 is a diagram of a system capable of providing machine-learning based persistence filtering, according to one embodiment.

FIG. 1 is a diagram of a system capable of providing machine-learning based persistence filtering, according to one embodiment. The automotive industry is focused on delivering safer, more comfortable, and more efficient mobility solutions. The path towards these objectives include, for instance, automation of many functions currently performed by drivers as a way to reduce the burden asked of drivers in today's busy and highly regulated road environment, while improving reaction times and decision making. In one embodiment, digital maps (e.g., a geographic database 101) provide information complementary to on-board sensors and driver cognition to enhance the assistance functions implemented in a vehicle 103. For example, the geographic database 101 can be a source of road attributes or other characteristics (e.g., speed limits, hazard warnings, road conditions, etc.) that would traditionally be conveyed to drivers via road signs. Therefore, the geographic database 101 can be important for enabling these driving automation use-cases as a source of road attributes or characteristics that can be retrieved automatically by the vehicles 103.

However, to support such use-cases, map service providers and automobile manufacturers (e.g., Original Equipment Manufacturers (OEMs)) face significant technical challenges and resource constraints to acquiring road attribute values determined for road signs for a wide geographic area and at target accuracy levels. This is because many road signs (e.g., traffic speed signs in particular) can change quickly over time (e.g., due to construction, temporary closures, new roads, etc.) and become obsolete, thereby potentially degrading performance and/or safety for autonomous driving use-cases.

Historically, map service providers maintain and deploy a fleet of dedicated mapping vehicles to map roads and their corresponding attributes and/or characteristics (e.g., including attributes recognized from road signs). Map service providers generally target 100% or near 100% accuracy to ensure the highest levels of safety and data quality for end users (e.g., consumer vehicles 103). To achieve the target accuracy or quality levels, map service providers often ensure that their mapping vehicles are equipped with highly accurate and expensive sensors that are generally capable of higher performance than normally included in consumer vehicles. However, as autonomous vehicles 103 with more capable sensors enter into widespread use, map service providers gain access to a larger body of sensor data from which map data can be derived to generate more frequent map updates. Accordingly, service providers face significant technical challenges with respect to updating existing map data (e.g., the geographic database 101) using sensor data from multiple vehicles 103 (e.g., self-driving autonomous vehicles) in an automated way.

To address these technical challenges, the system 100 of FIG. 1 introduces a capability to provide a machine learning-based persistence filter that can process sensor data representing observations of map features in the real world to determine whether to update map data. In one embodiment, the system 100 takes existing digital map data that represents the state of the world at, e.g., timestamp $t_o$. The system 100 then gathers sensor data from multiple vehicles 103 (e.g., self-driving autonomous vehicles with advance sensors such as but not limited to high definition cameras, LiDAR, radar, infrared, etc.) that were collected between timestamp $>t_o$ and a designated time (e.g., the current time). Then, fusing all of the sensor data together, the system 100 produces an updated map that represents the state of the actual world at the designated time (e.g., the current time).

One of the problems in this map update process is to decide, when to add, remove, or update a particular feature (e.g., a detected road sign or other road furniture) in the update map data. For example, the system 100 should be able to automatically decide whether a new feature or sign observation that was observed in the sensor data (e.g., a positive observation) was an actual observation of a newly installed signpost, or whether the observation was a false positive. Similarly, in the cause of a negative observation (e.g., the sensor data indicates no presence of the signpost or road feature/furniture), the system 100 should be able to decide if a signpost or other road feature/furniture was recently removed or updated in the real world or was a missed detection in the sensor data due to occlusion, sensor failure, etc.

In one embodiment, the system 100 can use a "persistence filter" to address the problems described above. In one embodiment, the persistence filter can be based on a recursive Bayesian estimator that estimates a posterior probability value for each feature in the output map data generated by the system 100. The filter, for instance, takes in raw complex sensor data and converts the raw sensor data into a simplified input consisting of a sequence of one and zeroes (or any other equivalent binary representation). By way of example, the value 1 (or other designated binary value) represents that a sensor of one of the reporting vehicles 103 saw the feature in the real world (e.g., based on the sensor data collected from the sensor), and the value 0 (or other designated binary value) represents its absence in the sensor data. Then, the sequence is sorted in order of the time it was observed by the sensor (e.g., from left to right) to create a time-ordered set of binary values representing positive observations (e.g., that the feature is detected in the sensor data at a given location) and/or negative observations (e.g., that the feature is not detected in the sensor data at a given location).

In one embodiment, each observation value (e.g., 0 or 1) in this sequence is derived from a single vehicle 103 or single drive of the vehicle 103 passing by a location associated with the feature. Once the system 100 has the time-stamp-sorted sequence of positive and/or negative observations values (e.g., 1's or 0's), the system 100 can run the persistence filter (e.g., the Bayesian persistence filter) to estimate the posterior probability that the feature is present or absent at a geographic location associated with the collected sensor data. Once the system 100 has this probability, the system 100 can use this value to determine whether to add, remove, or update a feature in the digital map data. In one embodiment, after processing a set of observations derived from the collected sensor data, if the posterior probability value of a particular feature goes below a certain probability threshold, then it is a strong indication that the feature has been removed in the real world and that the system 100 should update the map data to reflect the same. Conversely, if the posterior probability value of a particular feature goes above a certain probability threshold, then it is a strong indication that the feature has been added in the real world and that they system 100 should update the map data to reflect the same.

However, a Bayesian persistence filter traditionally does have any concept of "memory." For example, if the last N observations were all positive observations (e.g., 1's), then the introduction of a single negative observation should not have as great of an impact in reducing the probability of presence/absence of a feature compared to just having one prior positive observation just before receiving a single negative observation. However, if the N observations also contain one or more negative observations, then the introduction of another negative observation should have a greater downward impact on the probability. But, in the traditional Bayesian persistence filter, the impact of a single negative observation is significant, which makes this filter very sensitive to noise and can make the filter output unstable.

To address the technical challenge of reducing filter sensitivity to noise, the system 100 introduces a capability to provide a totally different framework from the Bayesian persistence filter to solve the same problem. In one embodiment, the system 100 uses a machine learning-based (ML) persistence filter 105 (as opposed to a Bayesian persistence filter—not shown) that uses a Recurrent Neural Network (RNN) to introduce the idea of "memory" and predict the probability of existence of a feature based on the memory of prior observations of the feature. RNNs enable information to persist or be "remembered" in a machine learning model. In one embodiment, the system 100 can use long short term memory (LSTM) based networks which are special kinds of RNNs that include a memory cell with a forget gate to remember information for a longer duration of time than a general RNN.

By way of example, RNNs are a class of neural networks in which connections between nodes form a directed graph along a temporal sequence (e.g., along a time sequence of feature observations). RNNs can use their internal states as memory to process variable length sequences of inputs. These properties of RNNs enable the machine learning-based to exhibit temporal dynamic behavior when making predictions of whether a feature is present or absent at a geographic location given a set of sensor-based observations of the feature. LSTMs further include nodes or units composed of a cell, an input gate, an output gate, and a forget gate. This architecture enables the LSTM node or unit to remember values over arbitrary time intervals and to regulate the flow of information into and out of the cell for prediction tasks (e.g., predicting the presence or absence of a feature and/or the probability of the presence/absence of the feature). It is noted that LSTMs are provided as one example of an RNN that can be used according to embodiments described herein. It is contemplated that any equivalent RNN or other machine learning model or architecture with equivalent memory capabilities can be used in place of or in addition to the models explicitly described herein.

In one embodiment, the machine learning-based persistence filter 105 (e.g., incorporating RNNs, LSTMs, or equivalent) takes the same input sequence of observations (e.g., 1's and 0's arranged by timestamp), and predicts the probability of existence or absence of a feature (e.g., road sign/road furniture) based on whole sequence. This machine learning-based framework is totally different from the embodiment of the Bayesian filter described above but they both solve the same problem. However, the embodiments of the machine learning-based persistence filter 105 described herein are advantageously less susceptible to noise affecting the accuracy of feature existence/absence predictions.

Another advantage is that there is no requirement to set prior values in machine learning-based models (e.g., LSTM-based models), whereas in the traditional Bayesian persistence filter, a prior probability value has to be set. This prior probability value significantly influences the trajectory of the prediction (e.g., posterior probability) curve. In addition, Bayesian persistence filter models generally have to be set based on the noise model of the incoming feature observation or sensor data. So, every time the Bayesian persistence filter is run for a new source of data that has a different noise model, the parameters of the Bayesian persistence filter have to also be changed. However, in the embodiments of the machine learning-based or LSTM/RNN-based persistence filter 105 described herein, the system 100 can use the same network or machine learning model to predict on different kinds of data sources without having to change any parameters (e.g., parameters that account for data noise).

As shown in FIG. 1, the system 100 (e.g., via a mapping platform 111) can use sensor data 107 collected from vehicles 103 (e.g., self-driving or autonomous vehicles equipped with sensors 109 capable of detecting map features 113 in the real world such as, but not limited to, road signs and/or attributes of the road signs (e.g., speed limit values, heading, location, etc.). the sensor data 107 can be collected directly from the vehicles 103 to the mapping platform 111 or can be relayed from the vehicles 103 through an Original Equipment Manufacturer (OEM) platform 119 corresponding to the respective manufacturers of the vehicles 103. In one embodiment, the sensors 109 along with a feature detector 115 (e.g., computer or machine learning-based models for identifying features or other objects from sensor data 107 such as image data, 3D mesh data, radar echoes, etc.) comprise a computer vision system 117 of the vehicle 103 that can be used to detect and report sensor data 107 and/or observations of regarding features 113 existing at a geographic location in the real world.

In one embodiment, by using sensor data 107 from the sensors 109 and/or computer vision systems 117 of vehicles 103 operating in the field, the system 100 can obtain enough sensor data 107 for storage and processing in an observations database 121 to generate a map update 123 for the digital map data of the geographic database 101 to remove, add, or update map features (e.g., road signs, road furniture, etc.) and/or to perform the map update 123 more frequently than traditional means. This is because the penetration rate of self-driving vehicles 103 is expected to be higher than the penetration rate of specialized mapping vehicles. In other words, there are likely to be many more vehicles 103 operating in a road network capable to detecting and recognizing map features (e.g., road signs) at any given time than there are specialized mapping vehicles. Achieving number parity between vehicles 103 and specialized mapping vehicles would be cost and resource prohibitive. In one embodiment, depending on the number of participating vehicles 103 (e.g., thousands of vehicles 103 or more), the system 100 can learn and/or detect the presence/absence of map features 113 on the order of hours or in near real-time versus the quarterly updates (e.g., on the order of months) achieved by using less numerous specialized mapping vehicles.

In one embodiment, the mapping platform 111 can publish or other provide access to the geographic database 101 and/or map update 123 over a communication network 125 to any user of the data including but not limited to a services platform 127, one or more services 129a-129n (also referred to as services 129), one or more content providers 131a-131m (also referred to as content providers 131), etc.

Figure 2:
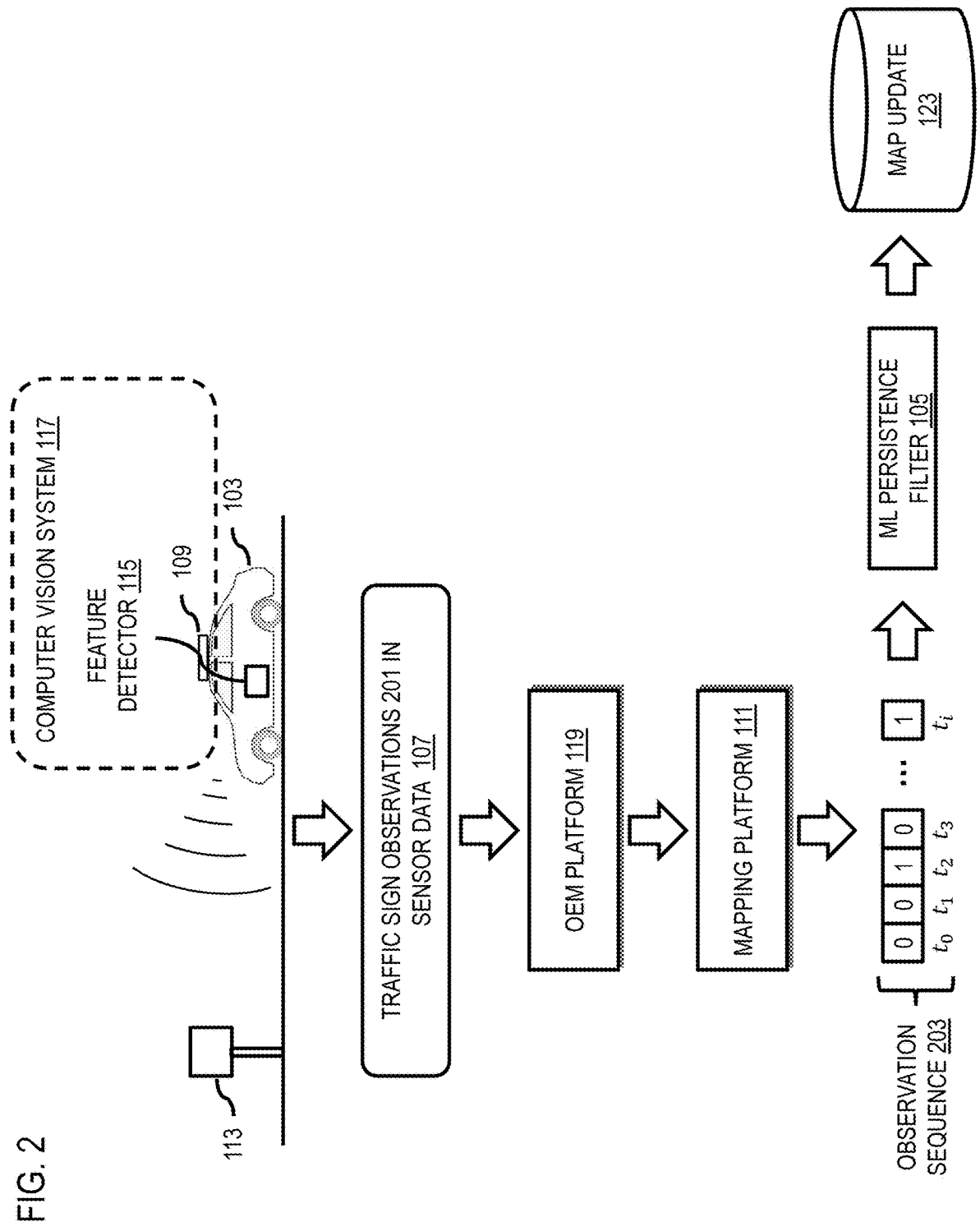
FIG. 2 is a diagram illustrating an example of reporting traffic sign observations from a vehicle, according to one embodiment.

FIG. 2 is a diagram illustrating an example of features observations from a vehicle 103, according to one embodiment. FIG. 2 illustrates an example in which the vehicle 103 uses its computer vision system 117 to detect a feature 113 that is a road sign. This detection process, for instance, is referred to as traffic sign recognition (TSR) or traffic sign learning. TSR learns a traffic sign (e.g., a speed limit sign) and the sign's property (e.g., a speed limit value depicted by a speed limit sign) located in a road network by using multiple observations from different vehicles 103 or different drives by the vehicles 103. In one embodiment, TSR or feature observations (e.g., represented in the sensor data 107) from multiple consumer vehicles 103 are map matched to road link records of the geographic database 101 and spatially clustered according to detected sign properties. For example, TSR observations that are close in space (e.g., within a threshold distance of each other) and have the same or similar properties are aggregated into a cluster. In one embodiment, a learned sign's property or characteristic (e.g., a road attribute value indicated by the learned sign such as a speed limit value) can then be determined based on the property of the observations in a cluster (e.g., a consensus property, unanimous property, etc. of the cluster). This learned road attribute value (e.g., speed limit value) can be associated with one or more road links corresponding to or near the location of the learned sign. In one embodiment, the location of the learned sign can be learned by determining a mean location of observations in a cluster (or any other equivalent or similar function to a mean function).

The embodiments described herein focus on how to determine when multiple image recognition observations (e.g., positive observations indicating an existence of a sign/feature and/or negative observations indicating an absence of a sign/feature) made by vehicles 103 provide data for the system 100 to designate that a sign and/or the sign's property (e.g., a sign value) exists or not based on using a machine learning-based persistence filter 105 to generate a map update 123. For example, as shown in FIG. 2, the vehicles 103 that contribute TSR observations 201 (or any other feature observation) indicated in their collected sensor data 107 to the mapping platform 111 for processing. The observations 201 and/or sensor data 107 can be collected via respective computer vision systems 117 or other sensors 109 of the vehicles 103. These computer vision systems 117 can be any type of sign or feature detection system known in the art or equivalent, for instance, comprising individual image recognition software or feature detectors 115 (e.g., machine learning or pattern matching models) and sensors 109 (e.g., optical sensors, radar sensors, LiDAR sensors, location sensors, etc.) that can detect and recognize features such as, but not limited to, road or traffic signs and their attributes observed by the sensors 109.

In one embodiment, the feature or TSR observations 201 from vehicles 103 for a recognized feature or sign 113 can include, but are not limited to, any of the following data fields: a sign value, sign type, latitude, longitude, heading, altitude, and/or side of road the sign was detected. The information may contain location information of the vehicle 103 itself and position information such as offsets in meters from the vehicle's location to represent the detected feature's or sign's location. The observations 201 and/or sensor data 107 can be transmitted from the vehicles 103 to the mapping platform 111 through an OEM platform 119 or directly from the vehicles 103 to the mapping platform 111. In one embodiment, the OEM platform 119 can be operated by a vehicle manufacturer and can aggregate observations 201 and/or sensor data 107 collected from the vehicles 103 that are produced by the manufacturer. The OEM platform 119 can pre-process (e.g., anonymize, normalize, etc.) the observations 201 before transmitting the processed observations 201 to the mapping platform 111 (e.g., operated by a map service provider). Although FIG. 2 depicts an example with one OEM platform 119, the mapping platform 111 can have connectivity to multiple OEM platforms 119 (e.g., each corresponding to a different vehicle manufacturer) to collect observations 201 and/or sensor data 107.

In one embodiment, given observations 201 from multiple vehicles 103 (or multiple OEM platforms 119) in a sensor chain (e.g., stored in observations database 121), the system 100 can process the observations 201 using the machine learning-based persistence filter 105 according to the embodiments described herein. For example, the mapping platform 111 can process the observations 201 to derive an observation sequence 203 that represents positive observations and/or negative observations of a given feature/sign in a time-ordered sequence of binary values (e.g., 1=positive observation and 0=negative observation). The observation sequence 203 is an aggregation of a set of observations made by difference vehicles 103 and/or different drives by the vehicles 103. The set, for instance, can include observations collected from the last update time of the digital map data of the geographic to a designated time (e.g., the current time). Each observation (e.g., in binary representation form) in the observation sequence 203 is associated with a respective timestamp (e.g., $t_o$ to $t_i$ as shown in the example) and ordered for earliest to latest time (e.g., from left to right in this example). The observation sequence 203 is then used as an input to the machine learning-based persistence filter 105 to predict the presence or absence of a feature/sign. The prediction output can then be used to generate a map update 123 for the geographic database 101. In one embodiment, the updated map data of the geographic database 101 can then be used for applications such as autonomous driving or any other functions or services (e.g., for any of the services 129 of the services platform 127).

Figure 3:
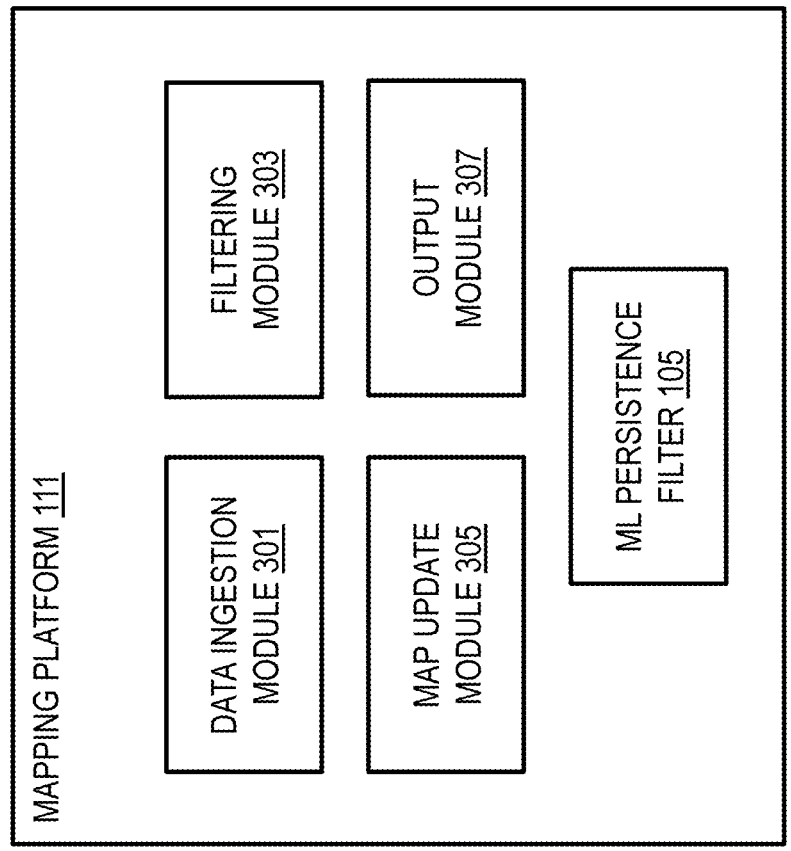
FIG. 3 is a diagram of the components of the mapping platform 111, according to one embodiment.

In one embodiment, as noted above, the mapping platform 111 can perform one or more functions related to providing machine learning-based persistence filtering according to the embodiments described herein. FIG. 3 is a diagram of the components of the mapping platform 111, according to one embodiment. By way of example, the mapping platform 111 may include one or more components including, at least in part, a data ingestion module 301, filtering module 303, map update module 305, and output module 307 that interact with the machine learning-based persistence filter 105 according to the embodiments described herein. It is contemplated that the functions of these components may be combined in one or more components or performed by other components with similar functionalities (e.g., the OEM platform 119, a services platform 127, any of the services 129 of the services platform 127, etc.). The above presented modules and components of the mapping platform 111 can be implemented in hardware, firmware, software, or a combination thereof. Though depicted as a separate entity in FIG. 1, it is contemplated that the mapping platform 111 may be implemented as a module of any of the components of the system 100. In another embodiment, one or more of the modules 301-307 may be implemented as a cloud-based service, local service, native application, or combination thereof. The functions of the mapping platform 111 and modules 301-307 are discussed in more detail below.

Figure 4:
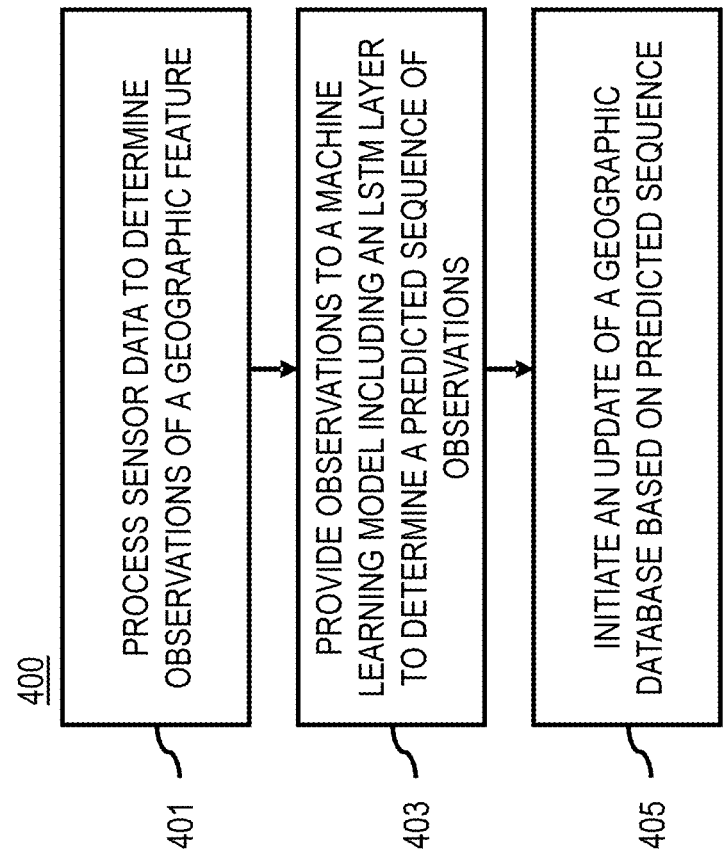
FIG. 4 is a flowchart of a process for providing a machine learning-based persistence filter, according to one embodiment.
Figure 11:
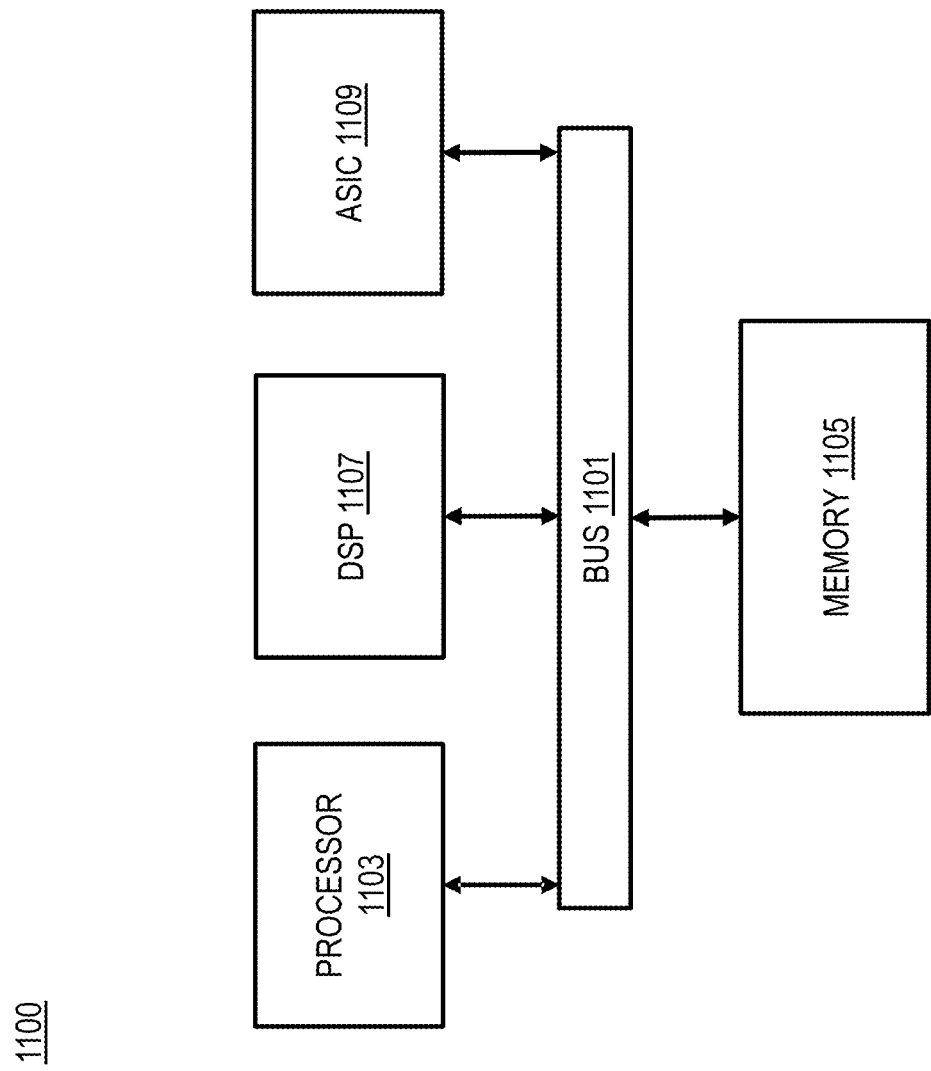
FIG. 11 is a diagram of a chip set that can be used to implement an embodiment.

FIG. 4 is a flowchart of a process for providing a machine learning-based persistence filter, according to one embodiment. In one embodiment, the mapping platform 111 and/or any of its modules 301-307 may perform one or more portions of the pipeline process 400 and may be implemented in, for instance, a chip set including a processor and a memory as shown in FIG. 11. As such, the mapping platform 111 and/or the modules 301-307 can provide means for accomplishing various parts of the process 400. In addition or alternatively, the OEM platform 119, services platform 129, and/or any of the services 129 may perform any combination of the steps of the process 400 in combination with the mapping platform 111, or as standalone components. Although the process 400 is illustrated and described as a sequence of steps, it is contemplated that various embodiments of the process 400 may be performed in any order or combination and need not include all of the illustrated steps.

At process 401, the data ingestion module 301 processes sensor data collected from a plurality of vehicles to determine one or more positive observations, one or more negative observations, or a combination thereof of a geographic feature (e.g., feature 113). By way of example, the geographic feature 113 can be any road sign/road furniture or any other feature that can be represented in the geographic database 101. As discussed above, the one or more positive observations are based on determining that sensor data 107 collected from one or more sensors 109 of the plurality of vehicles 103 indicates a presence of the geographic feature 113. Conversely, the one or more negative observations are based on determining that the sensor data 107 indicates an absence of the geographic feature 113. For example, if the sensor data 107 includes image data capture by a camera sensor of the vehicle 103, the image can be processed using a feature detector 115 of a computer vision system 117 (or any other equivalent image processing system) to identify the feature 113 as being depicted (e.g., in the case of a positive observation) or not depicted (e.g., in the case of a negative observation) in the captured imagery or sensor data 107.

In one embodiment, the data ingestion module 301 can specify or be configured with a time interval (e.g., expressed as a number of time epochs—discrete periods of times such as epochs of 15 mins, 1 hour, etc. in duration) from which the sensor data 107 or feature observations are collected. For example, in a map update use case, the interval for collecting feature observations can span a time period from the time of the last map update to the current time (or any other designated time endpoint). Although the illustrated example is with respect to a time period for map updates, the data ingestion module 301 can use any time period between any two specified points in time. The collected observations, for instance, are individual observations from different vehicles 103 or different drives of the vehicles 103 within a designated proximity of the a location being evaluated for the existence of a sign. The is proximity can be specified based on a threshold distance/radius around a location or can be determined based on clustering the locations of different observations (e.g., using any clustering means known in the art).

In one embodiment, the data ingestion module 301 collects raw sensor or observation data. In one embodiment, vehicles 103 provide raw traffic sign or other feature recognition data (e.g., TSR observations) as they drive. The vehicles 103 can provide information such as sign/feature type, sign value, vehicle location (e.g., latitude, longitude, heading, speed, etc.) when it observed the sign, side of road, and time stamp. These observations are then sent to the sensor chain (e.g., cloud) through the OEM platform 119 or directly to observations database 11 of the mapping platform 111 for processing by the data ingestion module 301. In one embodiment, raw TSR observation data for a predetermined period of time (e.g., for at least X hours or last number of time epochs) is collected or extracted from the sensor chain. For example, the data ingestion module 301 can use X=24, this means the mapping platform 111 processes TSR observations to learn new signs and sign properties every 24 hours with X signifying the number of 1-hour duration time epochs.

In one embodiment, the data ingestion module 301 can map match the retrieved raw observation data based, for instance, on the digital map data or a road network stored in the geographic database 101. In other words, the map matching process associates the observations to a road network so that each observation can be linked to a particular road link or road segment of the road network. In one embodiment, for map matching, the location data in each observation record (e.g., latitude, longitude, speed, heading, and/or the like of the reporting vehicle 103) are considered. It is contemplated that any map-matching process, means, algorithm, etc. (e.g., path-based map matching) known in the art or equivalent can be used in various embodiments described herein.

At process 403, the filtering module 303 provides the one or more positive observations, the one or more negative observations, or a combination thereof as an input sequence to a machine learning model (i.e., the machine learning persistence filter 105). In one embodiment, the input sequence of observations is sequenced according to timestamp data associated with the one or more positive observations, the one or more negative observations, or a combination thereof. As previously discussed, each observation can include, at a minimum, data indicating a detected existence or absence of a feature 113 (e.g., as indicated by captured sensor data 107) and timestamp data indicating a time at which each observation was made or captured by the vehicle 103. The timestamp of each observation can then be used to determine its order in the input sequence. For example, when the input sequence arranged from earliest to latest observation, the earliest observation will be at the leftmost position of the sequence that the latest observation will be at the rightmost position of the sequence. In addition, the one or more positive observations and the one or more negative observations can be represented as respective binary values in the input sequence. Thus, in one example embodiment, the input sequence is a simplified representation of the raw sensor data 107 as a time-ordered sequence of binary values representing positive and/or negative observations of a feature by different vehicles and/or drives.

In one embodiment, the machine learning-based persistence filter 105 is or otherwise includes a machine learning model with an input layer that feeds the input sequence to a recurrent neural network (RNN) layer. The input layer can have the same number of input nodes as the number of observations in the input sequence. Accordingly, in one embodiment, the mapping platform 111 can specify a fixed number of observations (e.g., 30 observations) to include in one input sequence. The input layer can then be constructed to include this fixed number of input nodes. As described above, an RNN layer is used to incorporate the concept of "memory" of previous observations to predict the existence or absence of a feature. By way of example, any machine learning model with equivalent memory capabilities can be used according to the embodiments described herein. In one embodiment, the RNN layer can be an LSTM layer that provides for even greater memory capability in embodiments described herein. The RNN layer, for instance, connects to a fully connected layer (e.g., hidden layers) of the machine learning model and then to an output layer. The output layer outputs a predicted sequence of the one or more positive observations, the one or more negative observations, or a combination thereof.

Based on the general RNN/LSTM based model described above, the machine learning-based persistence filter 105 can be constructed according to different architectures. FIG. 5 is a diagram illustrating an example LSTM architecture 500 for a machine learning-based persistence filter 105, according to one embodiment. In the architecture 500, each input node (e.g., corresponding to each illustrated box in FIG. 5) in the input layer 501 corresponds to an individual observation of the input observation sequence 503. The input observation sequence 503 can have a designated x number of observations (e.g., 30 observations or any other designated number of observations configured by the mapping platform 111), and thus the input layer 501 has the same x number of input nodes.

The input layer 501 is then fed into the LSTM layer 505 (or any other type of RNN layer) comprising multiple LSTM nodes (illustrated as LSTM boxes). As shown, each input node of the input layer 501 is connected to a corresponding LSTM node of the LSTM layer. Under the architecture, the LSTM output 507 of the last input 509 of the input observation sequence 503 is then connected to a fully connected layer 511 (e.g., comprising any designated number of hidden layers). In one embodiment, the fully connected layer 511 is then passed through an activation layer 513 before producing a predicted sequence 515 of observations via an output layer 517. The activation layer 513, for instance, include respective activation functions that act as mathematical gates between fully connected layer 511 and the output layer 517. In one embodiment, the activation function can be a non-linear function such as, but not limited, to a sigmoid function. By way of example, the sigmoid function can be a binary sigmoid function to generate the predicted observation of the output layer. An example of a binary sigmoid function is as follows:

$$f(x) = \frac{1}{1 + e^{-\lambda x}}$$

In the architecture 500, the output layer 517 has the same number of output nodes as input nodes so that the predicted sequence 515 includes the same number of observations as the input observation sequence 503. The predicted sequence 515 is what the machine learning-based persistence filter 105 predicts as the expected sequence of real-world observations given the input observation sequence 503. In one embodiment, the mapping platform 111 (e.g., via the map update module 305) uses the predicted sequence 515 to determine map updates (e.g., whether to add, remove, or update that particular feature in the digital map data of the geographic database 101).

In an example use case, training and testing of the machine learning-based persistence filter 105 based on the architecture 500 can be done with synthetic data with added noise (or any other equivalent synthetic or non-synthetic data set). For example, 1000 samples of observations sequences with 30 observations each (e.g., 30 drives) were generated and split into 80/20 ratio for training and testing purposes respectively. The ground truth for each sample could be one of the four possible cases listed below:
 (1) All ones (1's) in the sequence indicating that the feature existed through all drives or observations.
 (2) All zeros (0's) in the sequence indicating that the feature was not there throughout all of the drives or observations.
 (3) Ones (1's) until the first few drives or observations, and then zeros (0's) until the end of the sequence, indicating that the feature was removed somewhere in the middle of the 30 drive/observation sequence.

(4) Zeros (0's) until the first few drives or observations, and then ones (1's) until the end of the sequence, indicating that the feature was added somewhere in the middle of the 30 drive/observation sequence.

Based on the ground truth convention above, each positive sequence (1's in the ground truth) was generated with a probability of missed detection=0.2 and each negative sequence (0s in the ground truth) was generated with a probability of false alarms=0.2. These probability values were computed from the real data.

In this example, training of the machine learning-based persistence filter 105 based on architecture 500 was done in batches. So, by way of illustration and not as limitation, the training parameters are provided as follows:

The input layer 501 dimension is [Batch_Size, 30, 1]. The dimension of the LSTM layer 505 is [Batch_Size, 30, Num_Hidden_Layers_Of_LSTM];

The dimension of the fully connected layer 511 is [Num_Hidden_Layers_Of_LSTM, 30];

The dimension of the output layer 517 is [Batch_Size, 30]; and

A "Sigmoid Cross Entropy with Logits" or equivalent loss function can be used to train this network.

By way of example, to perform model training, the mapping platform 111 can incorporate a learning model (e.g., a logistic regression model, Random Forest model, and/or any equivalent model) to train the machine learning-based persistence filter 105 to make predictions (e.g., outputs) from input features or signals. During training, a learner module can feeds feature sets from a training data set (e.g., the ground truth data described above) into the machine learning-based persistence filter 105 to compute a predicted matching feature using an initial set of model parameters. The learner module then compares the predicted matching probability and the predicted feature to ground truth data in the training data set for each observation used for training. The learner module then computes an accuracy of the predictions (e.g., via a loss function) for the initial set of model parameters. If the accuracy or level of performance does not meet a threshold or configured level, the learner module incrementally adjusts the model parameters until the model generates predictions at a desired or configured level of accuracy with respect to the annotated labels in the training data (e.g., the ground truth data). In other words, a "trained" machine learning-based persistence filter 105 has model parameters adjusted to make accurate predictions with respect to the training data set. In the case of a neural network (e.g., the architecture 500), the model paraments can include, but are not limited, to the coefficients or weights assigned to each connection between nodes or neurons of the neural network.

In the example use case described herein, testing can result in finding different model hyperparameters for a given architecture (e.g., architecture 500) and the data type. For example, the hyperparameters may include, but are not limited to:

Batch_Size=50;
Epochs=50; and
Num Hidden Layers=64.

Figure 6A:
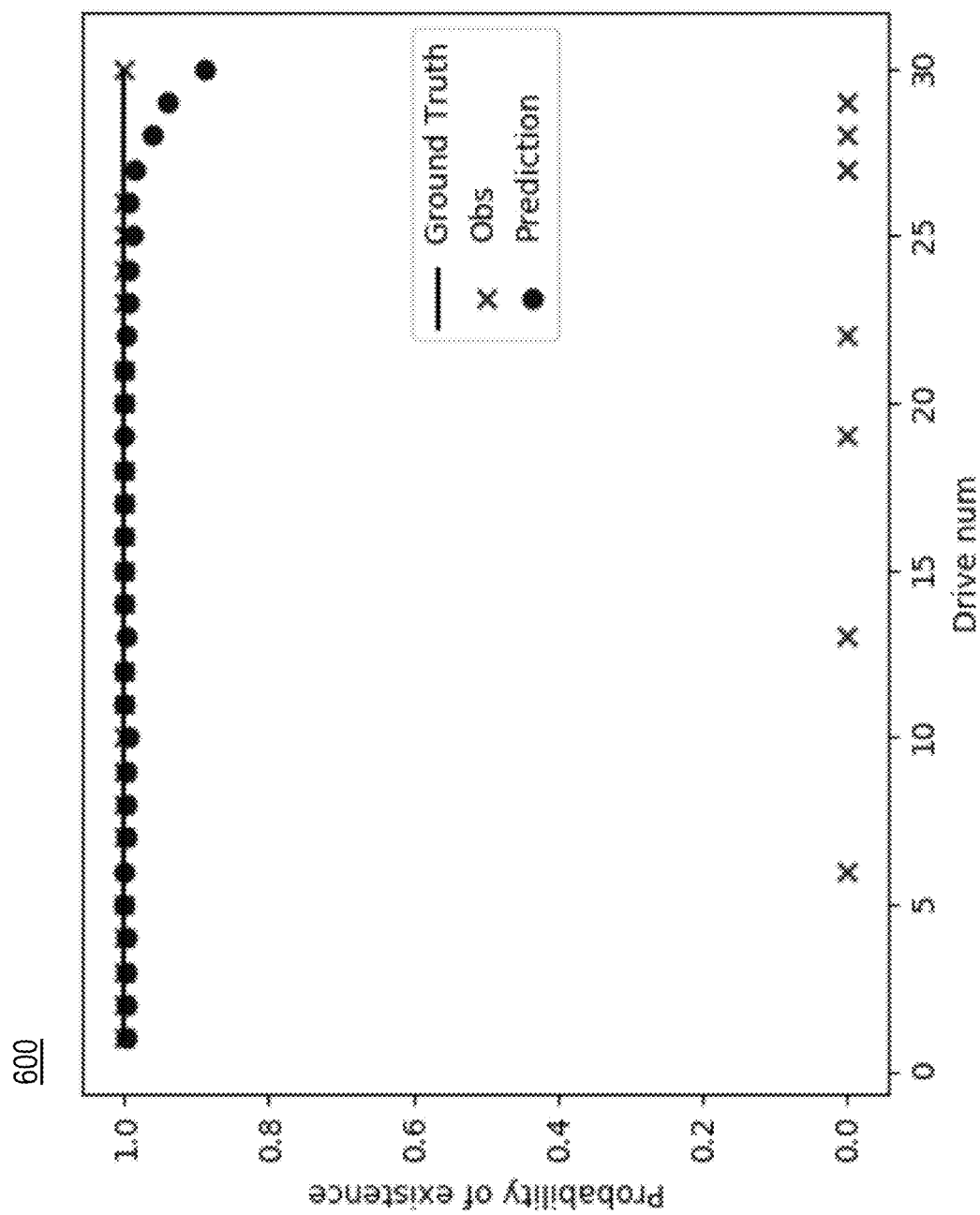
FIGS. 6A-6F are diagrams illustrating examples of persistence filtering based on the architecture of FIG. 5, according to various embodiments.
Figure 6B:
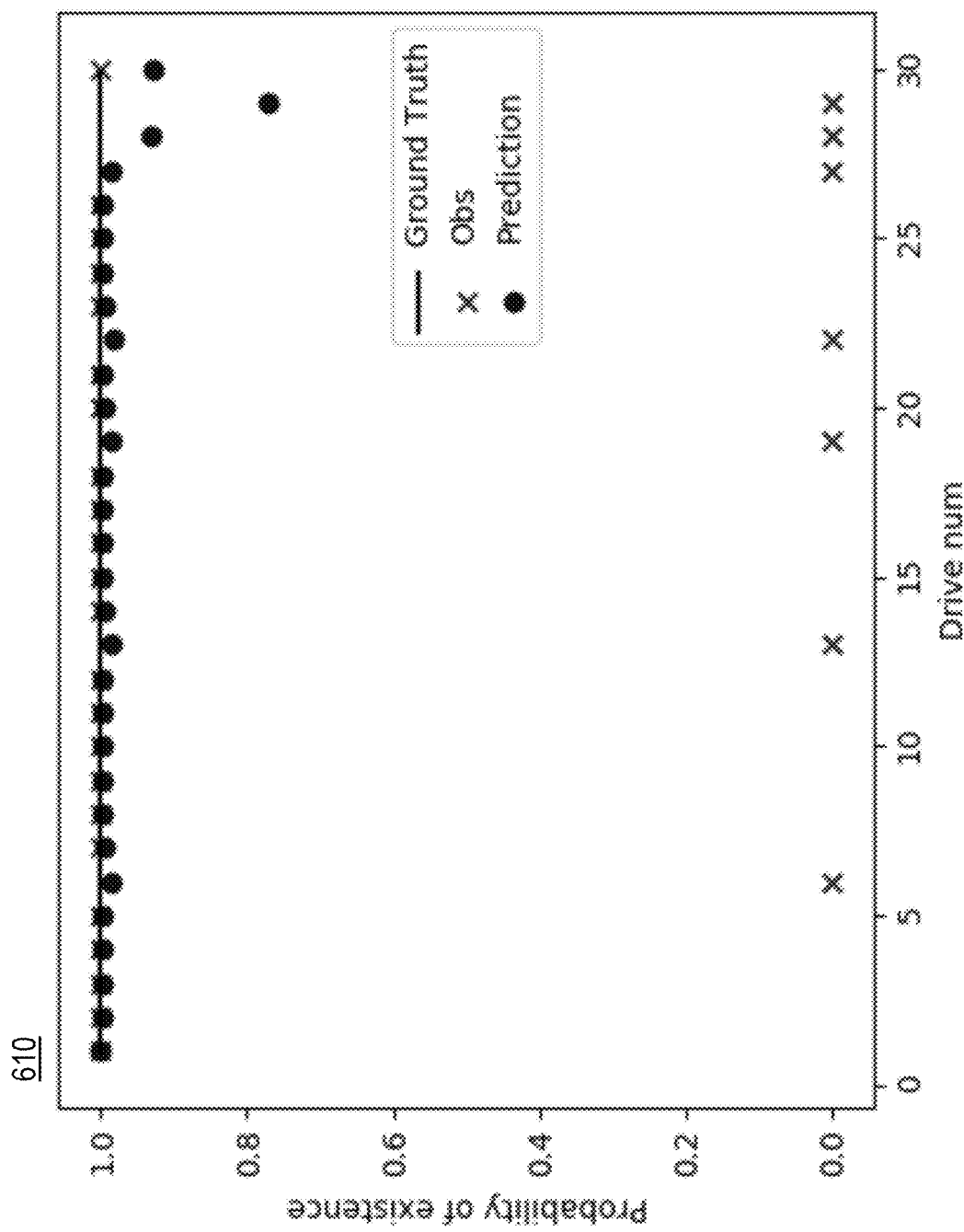

FIGS. 6A-6F are diagrams illustrating examples of persistence filtering, according to various embodiments. FIG. 6A illustrates a plot 600 of predicted probability of a feature existence versus drive number or observation for a scenario in which the ground truth (indicated by a solid black line) is all 1's, thereby indicating that the feature exists in the real world. The input observations (indicated by crosses) have noise (e.g., include both positive and negative observations even though the ground truth is that the feature exists). These noisy observations are used as an input into the machine learning-based persistence filter 105 to determine the predicted probability of existence after each observation (indicated by dots). Note that, as shown, the predicted probabilities start dipping down because of the noise (e.g., incorrect observation) in the last three out of the last four observations. FIG. 6B illustrates the a plot 610 of the same plot obtained using a traditional Bayesian persistence filter (as opposed to the machine learning-based persistence filter 105 of FIG. 6A). When compared to the machine learning-based persistence filter 105 of FIG. 6A, the Bayesian filter is more sensitive to the noise.

Figure 6C:
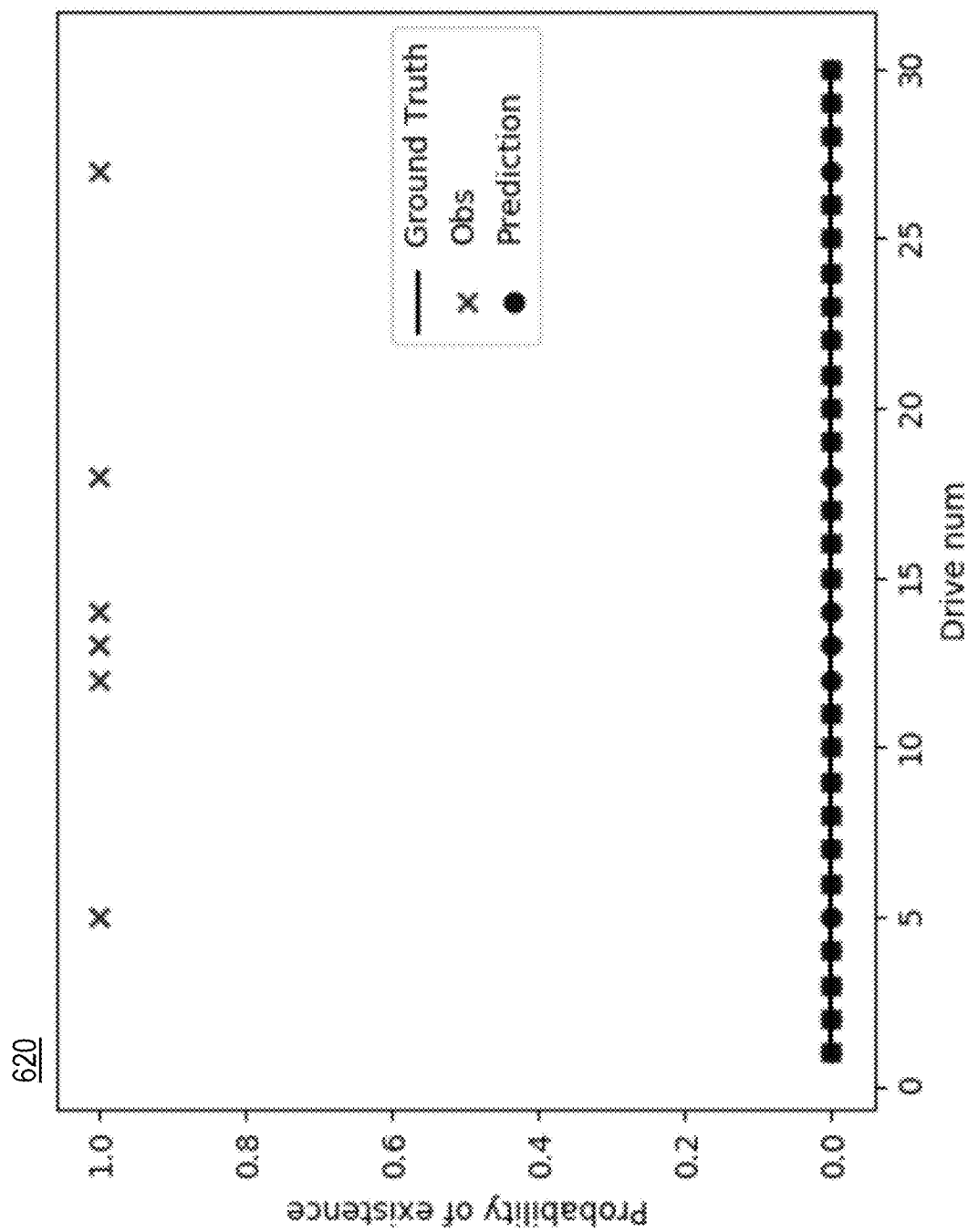
Figure 6D:
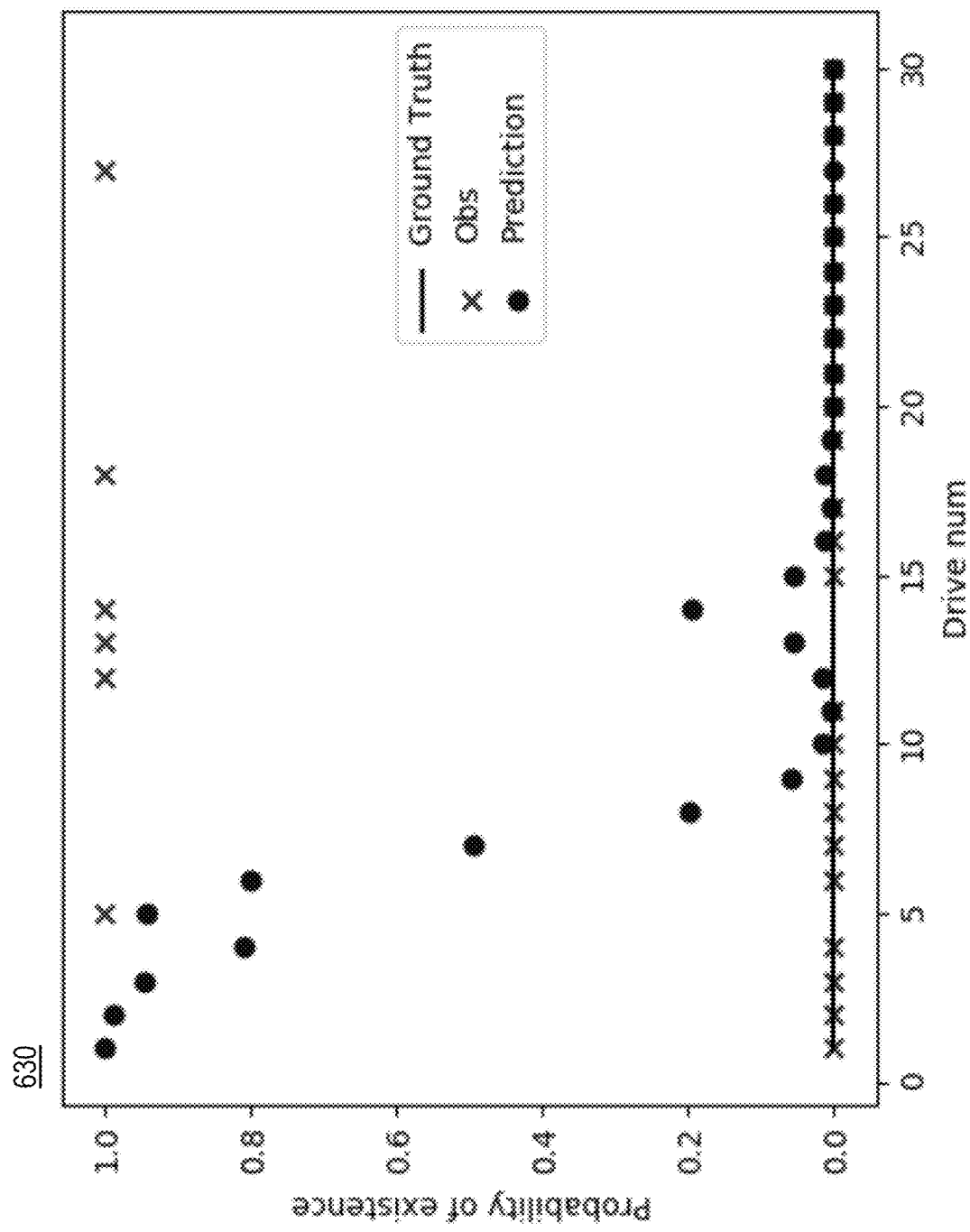

FIG. 6C illustrates a plot 620 of predicted probability of a feature existence for a scenario in which the ground truth (indicated by the solid black line) is all O's, thereby indicating that the feature does not exist in the real world. As in the graphs discussed above, observations with noise are indicated by crosses and predictions by machine learning-based persistence filter 105 are indicated by dots. FIG. 6D illustrates a plot 630 of the same plot as FIG. 6C obtained using the Bayesian persistence filter. In the example of FIG. 6D, the Bayesian persistence filter has a prior probability value of 1. That is why the predictions shown in FIG. 6D also start from 1. The prior probability value is a parameter that has to be set before the Bayesian persistence filter is run for the first time. The machine learning-based persistence filter 105 does not have such issues.

Figure 6E:
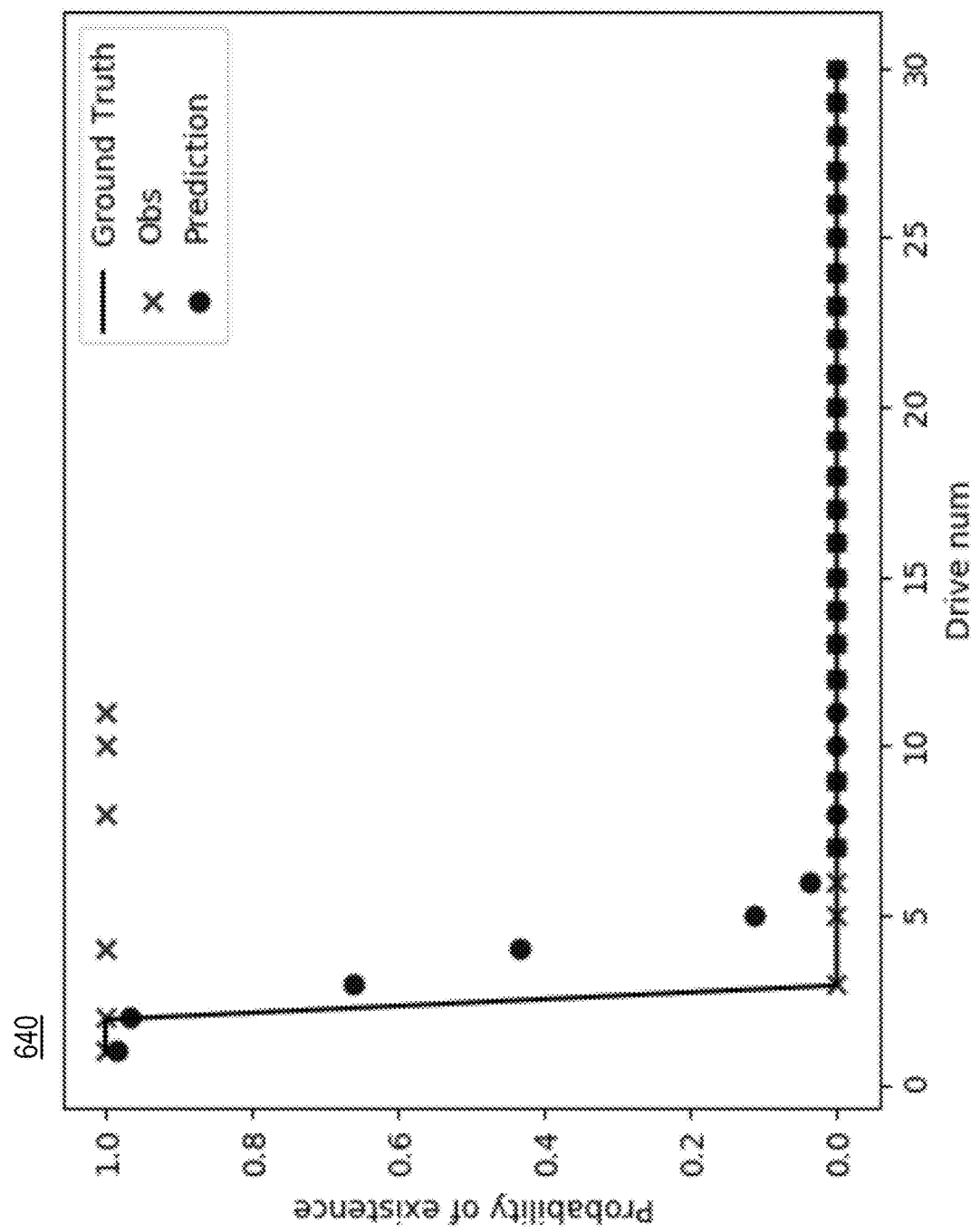
Figure 6F:
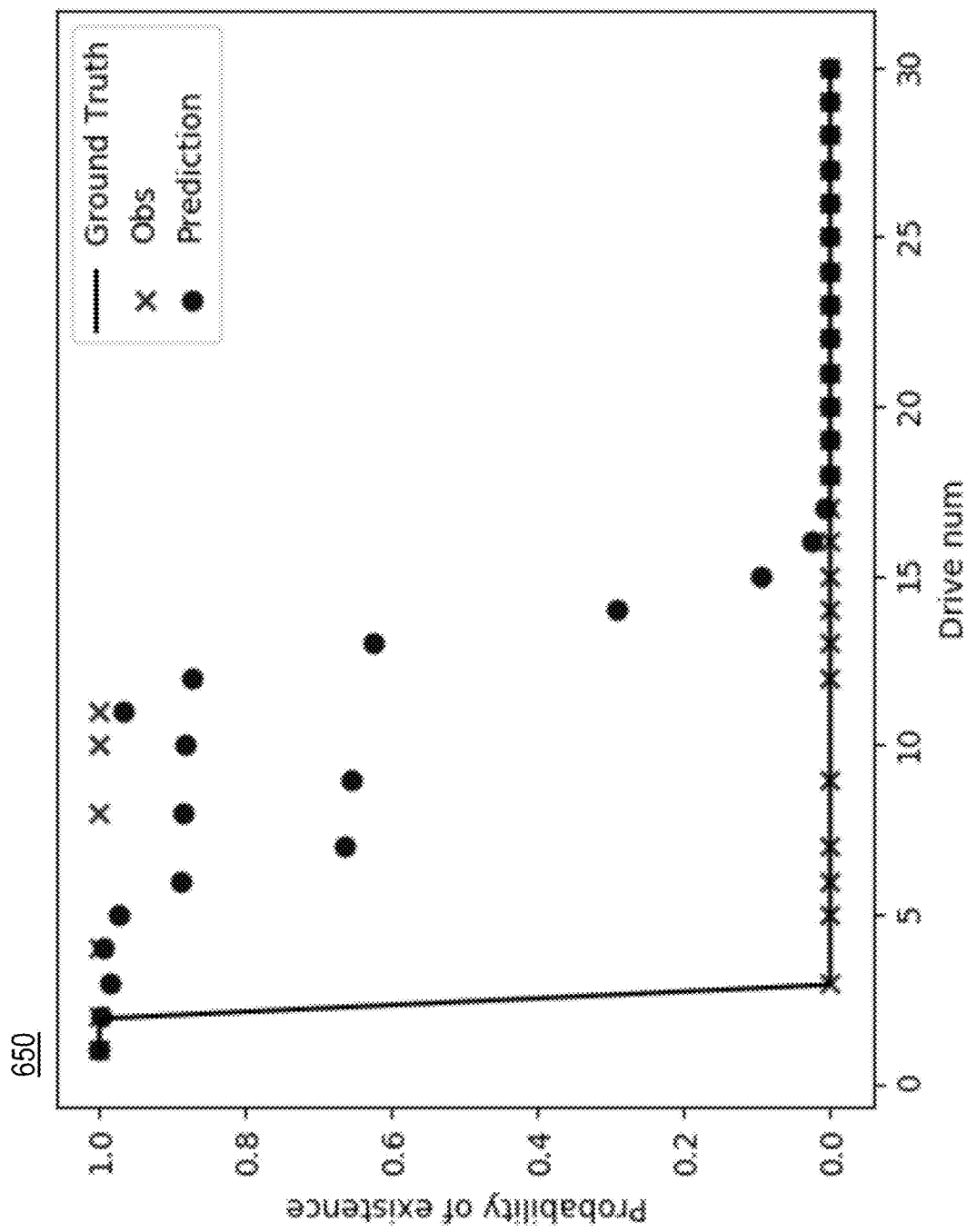

FIG. 6E illustrates a plot 640 of predicted probability of a feature existence for a scenario in which the ground truth is 1's until the second observation and then all 0's, thereby indicating that the feature existed until the second observation and then it was removed after that in the real world. As in the graphs discussed above, observations with noise are indicated by crosses and predictions by machine learning-based persistence filter 105 are indicated by dots. FIG. 6F illustrates a plot 650 that is the same plot as FIG. 6E obtained using a Bayesian persistence filter. The two plots 640 and 650 illustrate that the machine learning-based persistence filter 105 is less sensitive to noise when compared to the Bayesian persistence filter.

As noted above, the machine learning-based persistence filter 105 can have different architectures while retaining the memory properties of RNN/LSTM networks. FIG. 7 is a diagram illustrating an example LSTM architecture 700 for a machine learning-based persistence filter 105, according to one embodiment. The architecture 700 incorporates a machine learning model into a working framework that takes the existing state of the filter 105 for a feature and a new value from the input sequence as inputs into an input layer 701, and updates the posterior probability of the existence of the feature. So, at each time step in the input observation sequence 703, the architecture 700 takes in one observation value from the input observation sequence 703 and estimates one output value of the predicted observation sequence 705 (posterior probability) of the output layer 707 and then it repeats the process for the next value from the input observation sequence 703. In other words, an input node of the input layer 701 feeds an observation value in the input observation sequence 703 to the machine learning model (e.g., the machine learning-based persistence filter 105) to determine a predicted observation value and a posterior probability associated with the predicted observation value that is part of the predicted sequence 705. Then a next observation value in the input observation sequence 703 is processed using the machine learning model or persistence filter 105 based, at least in part, on the predicted observation value and the posterior probability.

In comparison, only the last output from the LSTM of the architecture 500 of FIG. 5 was connected to the fully connected layer. So, the architecture 500 was reading in the full input observation sequence before it was connected to the fully connected layer. In the architecture 700 of FIG. 7, each output from the LSTM layer 709 (e.g., corresponding to each input node of the input layer 701) is connected to the fully connected layer 711. In one embodiment, it is then it is passed through a Softmax layer 713 (or equivalent neural network layer capable of generating a posterior probability of the existence of a feature). The Softmax layer 713 outputs a probability distribution between the possible outputs (1 or 0), and the filtering module 303 selected an output probability from the probability distribution. For example, the Softmax layer 713 can take the maximum probability value as the final output or posterior probability prediction. In this way, the architecture 700 can get a value in the output or predicted sequence 705 as soon as it reads a value in the input sequence.

As with the example of architecture 500 of FIG. 5, training of the machine learning-based persistence filter 105 based on architecture 700 was done in batches. So, by way of illustration and not as limitation, the training parameters are provided as follows:

The input layer dimension is [Batch_Size, 30, 1];
The dimension of LSTM is [Batch_Size, 30, Num_Hidden_Layers_Of_LSTM];
The dimension of the Fully Connected Layer is [Num_Hidden_Layers_Of_LSTM, 2];
The dimension of the output is [Batch_Size, 30, 2]; and
A "Sequence to Sequence" or equivalent loss function can be used to train this network.

Again as with architecture 500, testing can result in finding different model hyperparameters for a given architecture (e.g., architecture 700) and the data type. For example, the hyperparameters may include, but are not limited to:

Batch_Size=50;
Epochs=50; and
Num Hidden Layers=64.

Figure 8A:
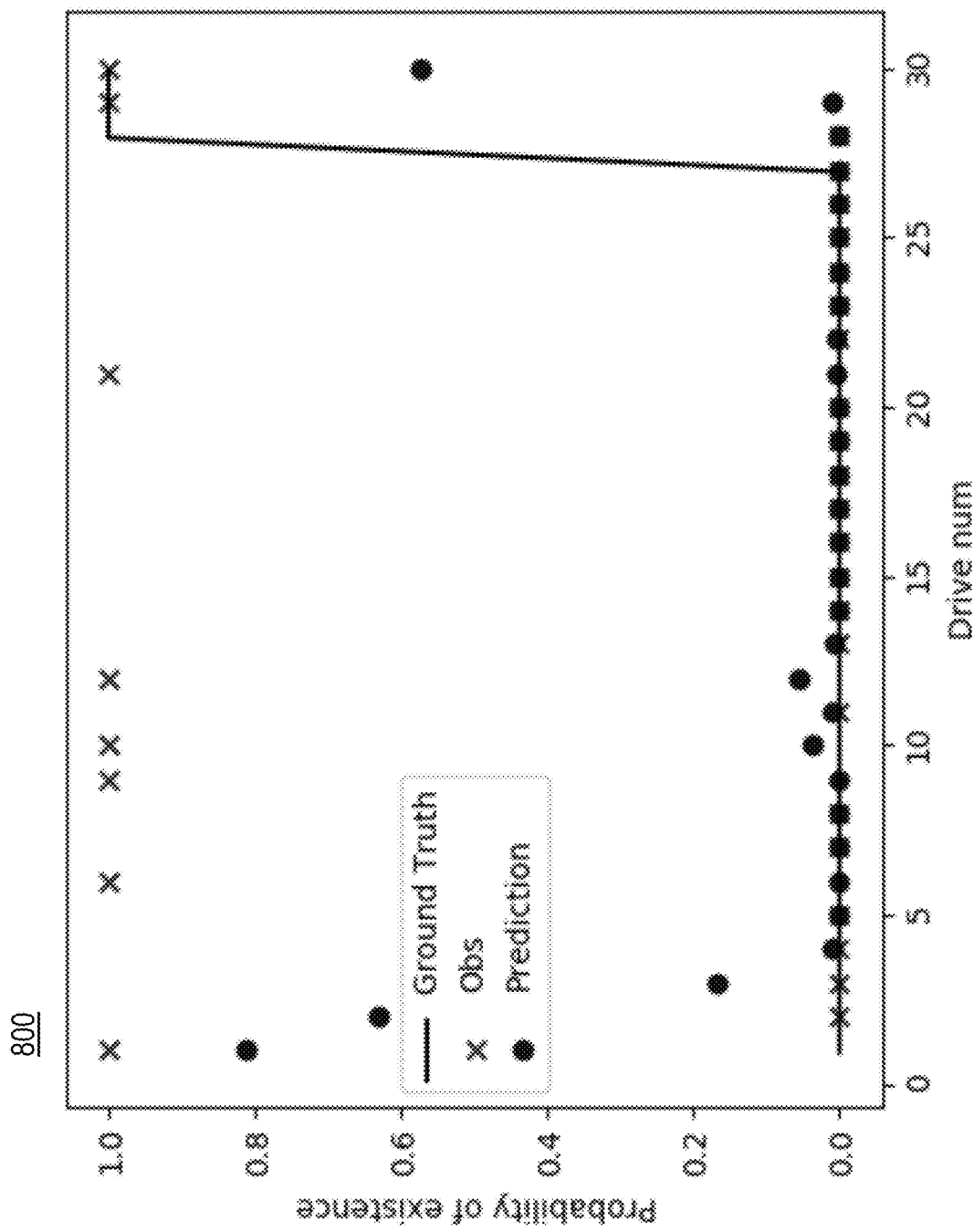
FIGS. 8A-8F are diagrams illustrating examples of persistence filtering based on the architecture of FIG. 6, according to various embodiments.
Figure 8B:
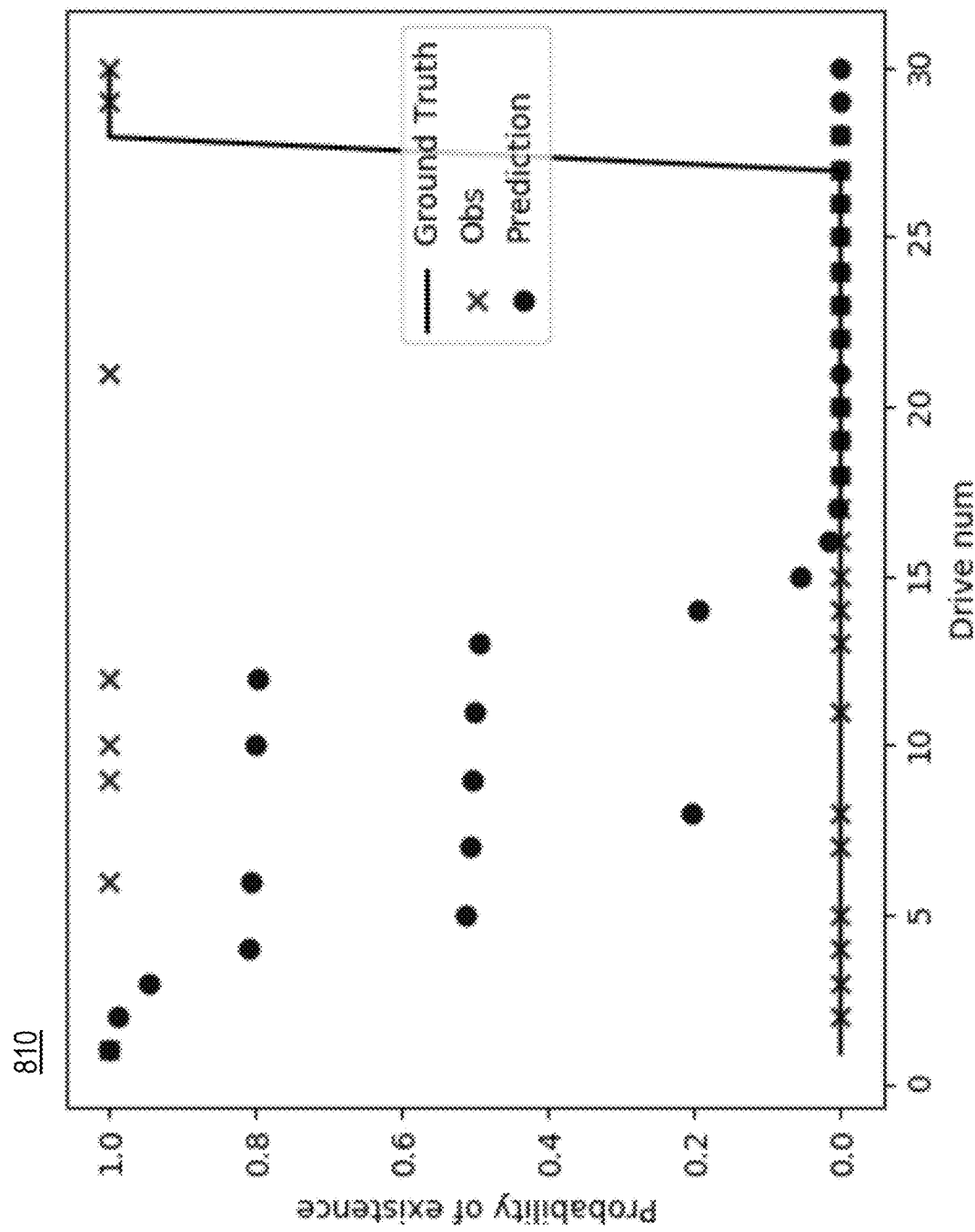

FIGS. 8A-8F are diagrams illustrating examples of persistence filtering based on the architecture of FIG. 6, according to various embodiments. FIG. 8A illustrates a plot 800 of predicted probability of a feature existence versus drive number or observation for a scenario in which the ground truth (indicated by a solid black line) is 0's until the $27^{th}$ observation or drive and then 1's until the end of the sequence, thereby indicating that the feature did not exist in the real world until the $27^{th}$ observation and then it was added after that. The input observations (indicated by crosses) have noise and the resulting predictions by the machine learning-based persistence filter 105 with architecture 700 are indicated by dots. FIG. 8B illustrates a plot 810 of the same plot obtained using a traditional Bayesian persistence filter (as opposed to the machine learning-based persistence filter 105). When compared to the Bayesian persistence filter, the machine learning-based persistence filter 105 of FIG. 8A is more stable to noise.

Figure 8C:
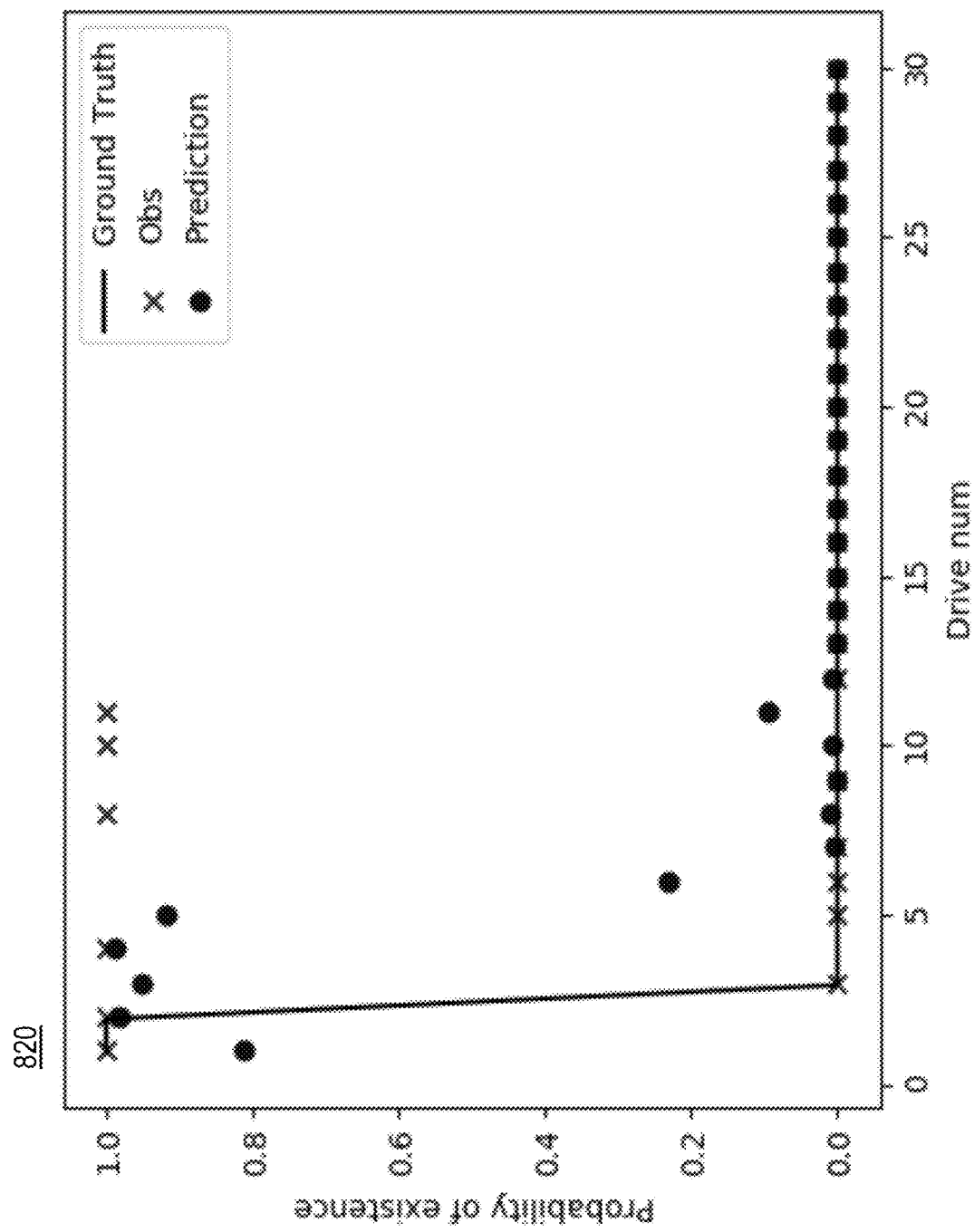
Figure 8D:
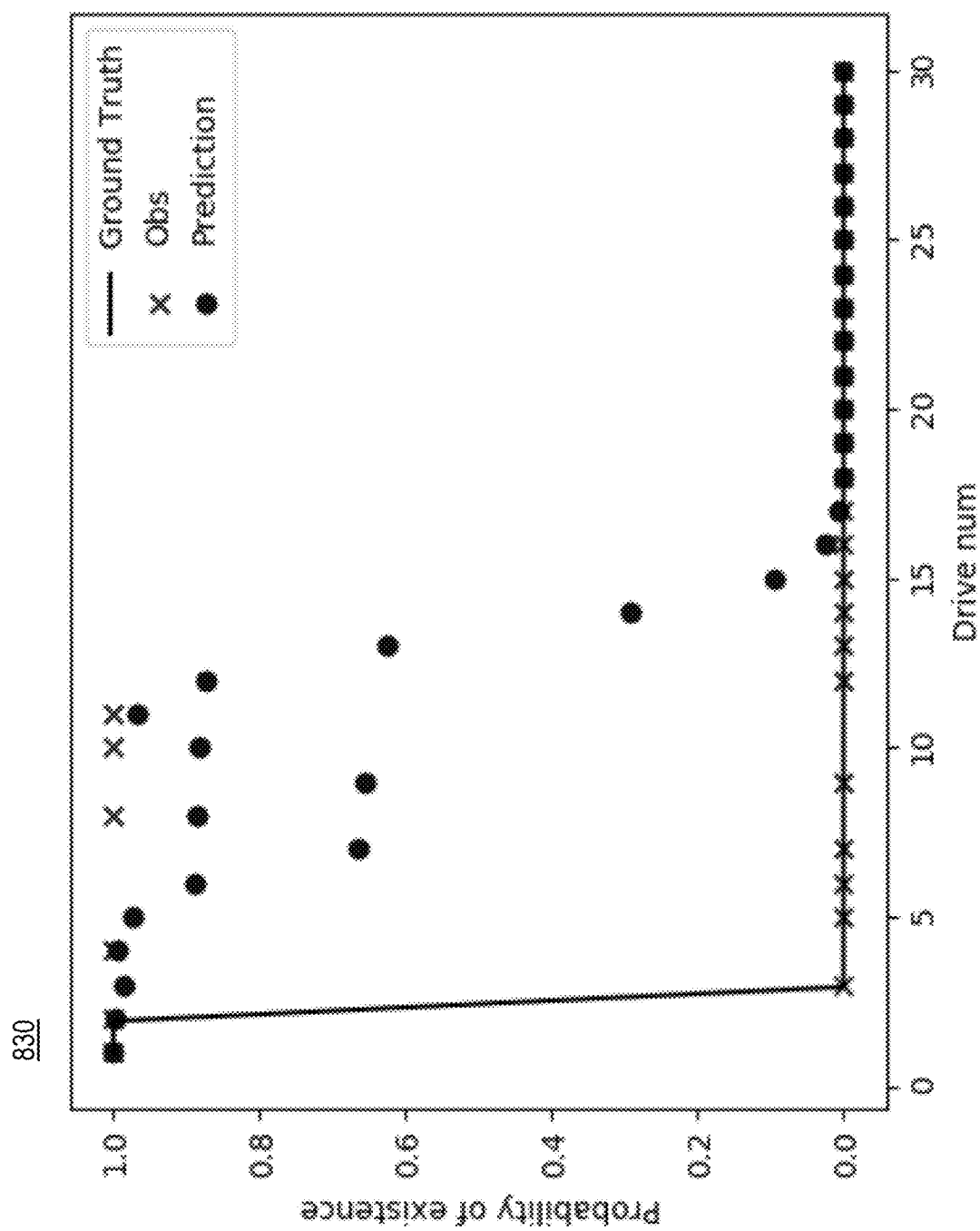

FIG. 8C illustrates a plot 820 of predicted probability of a feature existence for a scenario in which the ground truth (indicated by the solid black line) is 1's until the second observation then all 0's, thereby indicating that the feature existed until the second observation and then it was removed after that in the real world. As in the graphs discussed above, observations with noise are indicated by crosses and predictions by machine learning-based persistence filter 105 are indicated by dots. FIG. 8D illustrates a plot 830 of the same plot as FIG. 8C obtained using the Bayesian persistence filter. Here again, the machine learning-based persistence filter 105 is less sensitive to noise than the Bayesian filter.

Figure 8E:
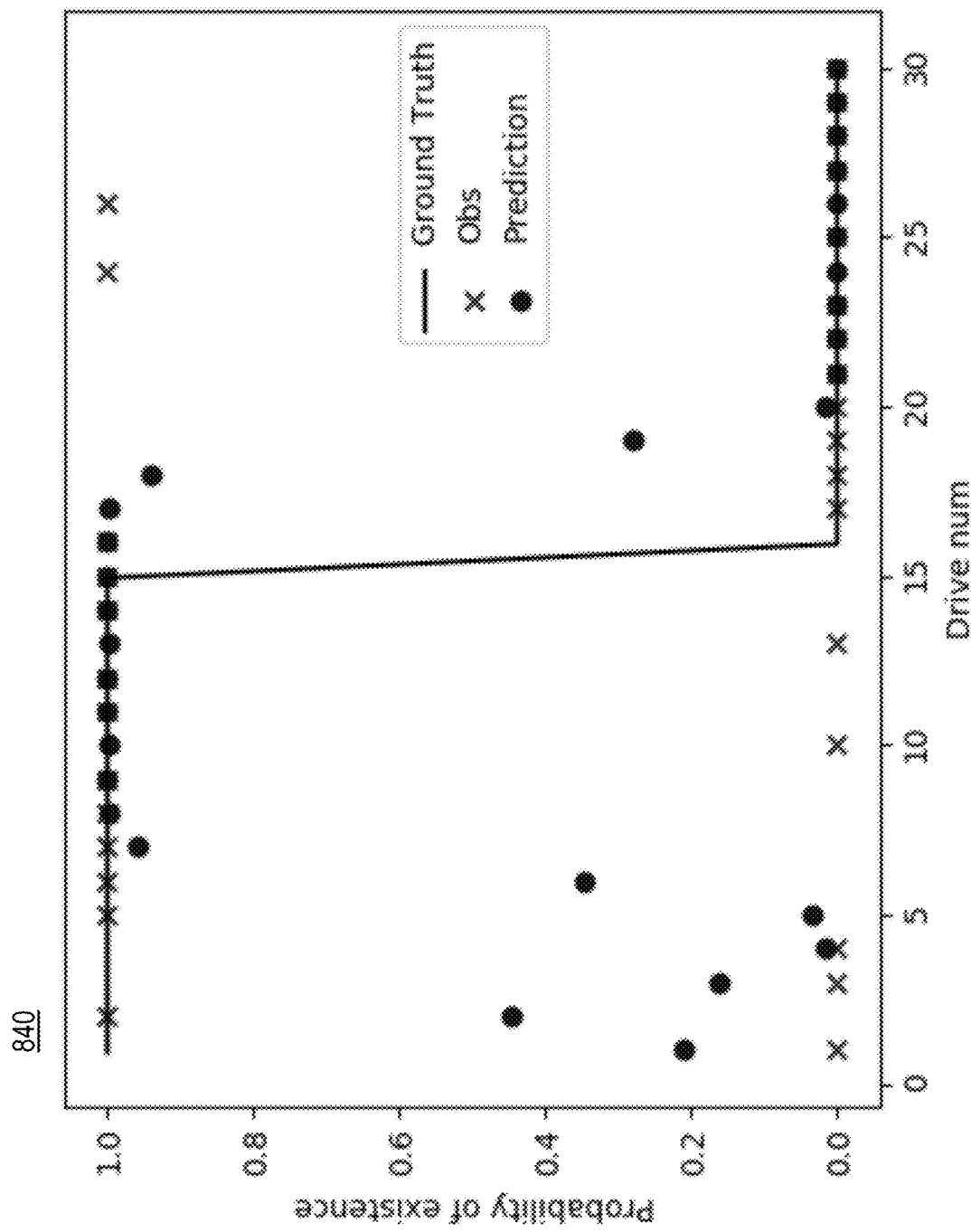
Figure 8F:
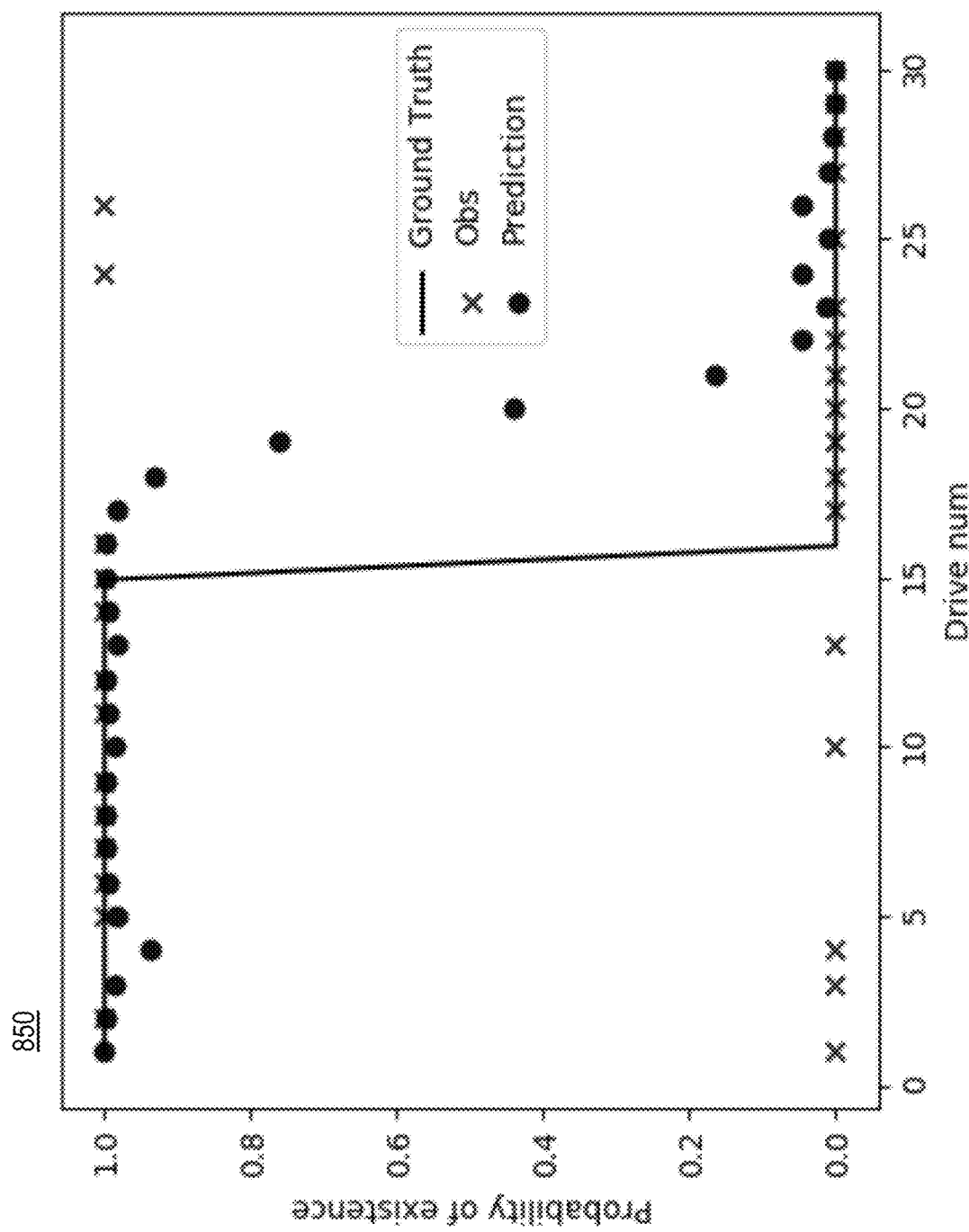

FIG. 8E illustrates a plot 840 of predicted probability of a feature existence for a scenario in which the ground truth is 1's until the $15^{th}$ observation and then all 0's, thereby indicating that the feature existed until the 15th observation and then it was removed after that in the real world. As in the graphs discussed above, observations with noise are indicated by crosses and predictions by machine learning-based persistence filter 105 are indicated by dots. FIG. 8F illustrates a plot 850 that is the same plot as FIG. 8E obtained using a Bayesian persistence filter. In this example, the Bayesian filter appears to work better (e.g., have a better match against the ground truth) for the initial few observations. That is because the Bayesian filter starts with a prior probability value of 1.0, whereas the machine learning-based persistence filter 105 does not have any such prior parameter. Instead, the machine learning-based persistence filter 105 depends on the observations at each time step in the input sequence. Since the first few observations are noise (0 instead of 1), it oscillates back and forth until the 5th observation. But after that, the machine learning-based persistence filter 105 stabilizes. In the later observations (form 23-26), the machine learning-based persistence filter 105 is more stable to noise whereas the Bayesian filter has some disturbances in the predicted output.

After the predicted sequence of observations is determined using the machine learning-based persistence filter according to the embodiments of process 403, at process 405, the map update module 305 initiates an update of a geographic database to add, remove, or update the geographic feature based on the predicted sequence. In one embodiment, the update of the geographic database is initiated based on a last observation value of the predicted sequence. For example, if the last observation in the predicted sequence indicates an existence of the feature, the map of the geographic database 101 can be updated to add the feature. Conversely, if the last observation in the predicted sequence indicates an absence of the feature, the map of the geographic database 101 can be updated to remove the feature.

After the map data is updated based on the output of the machine learning-based persistence filter 105, the output module 307 can provide the updated map data of the geographic database 101 for any service or application that uses such data. These services and application can include, but are not limited to, presenting a mapping user interface on a device, operating an autonomous vehicle, generating road attributes values for the geographic database 101, and/or any other use case for updated map data. For example, the output of the persistence filter 105 and/or the updated digital map data can be transmitted and/or presented on a user device (e.g., a navigation system of the vehicle 103, a user device such as a user equipment (UE) 133 executing an application 135 capable of presenting a mapping/navigation user interface.

Returning to FIG. 1, as shown, the system 100 includes a vehicle 103 with connectivity to the mapping platform 111 and/or OEM platform 119 for providing features observations for processing by the machine learning-based persistence filter 105 according to the various embodiments described herein. In one embodiment, the vehicle 103 includes the computer vision system 117 with sensors 109 and an in-vehicle feature detector 115 for generating feature observations. In some use cases, with respect to autonomous, navigation, mapping, and/or other similar applications, the in-vehicle feature detector 115 can detect traffic signs and their properties from sensor data to generate positive and/or negative feature observations.

In one embodiment, the mapping platform 111 can include a similar supervised learning mechanism that can include one or more feature detection models such as, but not limited to, neural networks, SVMs, decision trees, etc. to detect features, road signs, and/or other similar objects for mapping. For example, the supervise learning mechanism can be based on a neural network such as a traditional convolutional neural network which consists of multiple layers of collections of one or more neurons (e.g., processing nodes of the neural network) which are configured to process input feature sets (e.g., imagery) and output feature detections/classifications.

In one embodiment, the mapping platform 111, vehicle 103, UE 133, and/or other end user devices also have connectivity or access to the geographic database 101 which stores representations of mapped geographic features to facilitate autonomous driving and/or other mapping/navigation-related applications or services. The geographic database 101 can also store learned traffic sign data, as well as rules or filters for post-processing the learned traffic sign data and/or the TSR observations used for learning the traffic sign data according to the various embodiments described herein.

In one embodiment, the mapping platform 111, OEM platform 119, vehicle 103, UE 133, etc. have connectivity over the communication network 125 to the services platform 127 that provides one or more services 129 related to traffic sign learning (e.g., third-party traffic sign data services). By way of example, the services 129 may be third party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the mapping platform 111, OEM platform 119, services platform 127, and/or other components of the system 100 may be platforms with multiple interconnected components. The mapping platform 111, OEM platform 119, services platform 127, etc. may include multiple servers, intelligent networking devices, computing devices, components, and corresponding software for providing parametric representations of lane lines. In addition, it is noted that the mapping platform 111, OEM platform 119, computer vision system 117, etc. may be separate entities of the system 100, a part of the one or more services 129, a part of the services platform 127, or included within the UE 133 and/or vehicle 103.

In one embodiment, content providers 131a-131m (collectively referred to as content providers 131) may provide content or data (e.g., including feature observations, map updates, etc.) to the geographic database 101, the mapping platform 111, the computer vision system 117, the services platform 127, the services 129, the UE 133, the vehicle 103, and/or an application 135 executing on the UE 133. The content provided may be any type of content, such as map content, textual content, audio content, video content, image content, etc. In one embodiment, the content providers 131 may provide content that may aid in the detecting and classifying of features (e.g., traffic signs) and their properties from sensor data (e.g., image data), and estimating the confidence and/or accuracy of the detected features. In one embodiment, the content providers 131 may also store content associated with the geographic database 101, mapping platform 111, OEM platform 119, computer vision system 117, services platform 127, services 129, UE 133, and/or vehicle 103. In another embodiment, the content providers 131 may manage access to a central repository of data, and offer a consistent, standard interface to data, such as a repository of the geographic database 101.

In one embodiment, the UE 133 and/or vehicle 103 may execute a software application 135 to collect, encode, decode, and/or process feature observations according the embodiments described herein. By way of example, the application 135 may also be any type of application that is executable on the UE 133 and/or vehicle 103, such as autonomous driving applications, mapping applications, location-based service applications, navigation applications, content provisioning services, camera/imaging application, media player applications, social networking applications, calendar applications, and the like. In one embodiment, the application 135 may act as a client for the mapping platform 111, OEM platform 119, services platform 127, and/or services 129 and perform one or more functions associated with providing a machine learning-based persistence filter 105.

By way of example, the UE 133 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 133 can support any type of interface to the user (such as "wearable" circuitry, etc.). In one embodiment, the UE 133 may be associated with the vehicle 103 or be a component part of the vehicle 103.

In one embodiment, the UE 133 and/or vehicle 103 are configured with various sensors 109 for generating or collecting environmental sensor data (e.g., for processing by the in-vehicle feature detector 115 and/or mapping platform 111), related geographic data, etc. including but not limited to, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 133 and/or vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 133 and/or vehicle 103 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 133 and/or vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 125 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, OEM platform, services platform 127, services 129, UE 133, vehicle 103, and/or content providers 131 communicate with each other and other components of the system 100 using well known, new or still developing protocols. In this context, a protocol includes a set of rules defining how the network nodes within the communication network 125 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
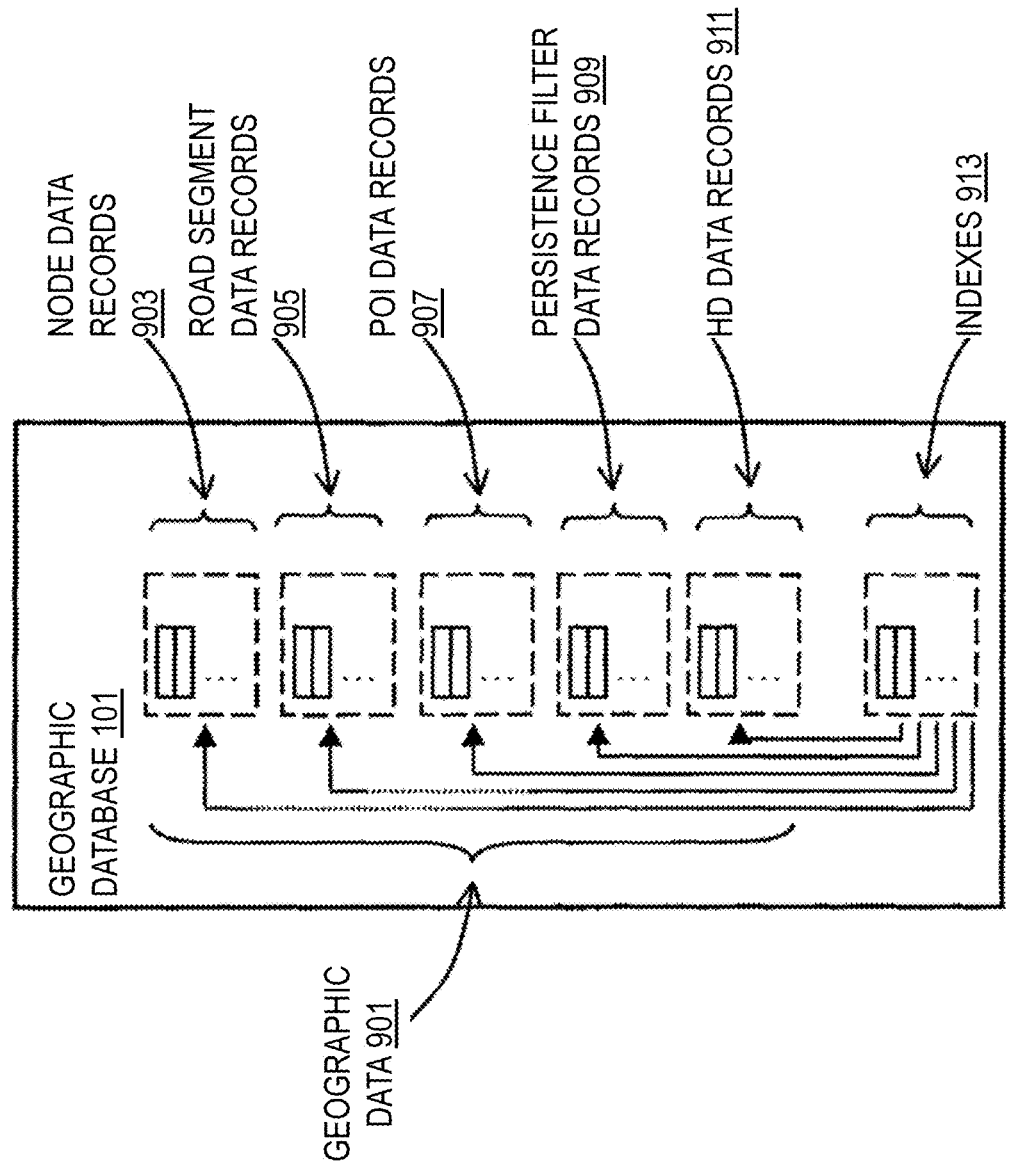
FIG. 9 is a diagram of a geographic database, according to one embodiment.

FIG. 9 is a diagram of a geographic database 101, according to one embodiment. In one embodiment, the geographic database 101 includes geographic data 901 used for (or configured to be compiled to be used for) mapping and/or navigation-related services, such as for video odometry based on the parametric representation of lanes include, e.g., encoding and/or decoding parametric representations into lane lines. In one embodiment, the geographic database 101 include high resolution or high definition (HD) mapping data that provide centimeter-level or better accuracy of map features. For example, the geographic database 101 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as signposts, including what the signage denotes. By way of example, the HD mapping data enable highly automated vehicles to precisely localize themselves on the road, and to determine road attributes (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 101 is stored as a hierarchical or multilevel tile-based projection or structure. More specifically, in one embodiment, the geographic database 101 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 101 includes node data records 903, road segment or link data records 905, POI data records 907, persistence filter data records 909, HD mapping data records 911, and indexes 913, for example. More, fewer, or different data records can be provided. In one embodiment, additional data records (not shown) can include cartographic ("carto") data records, routing data, and maneuver data. In one embodiment, the indexes 913 may improve the speed of data retrieval operations in the geographic database 101. In one embodiment, the indexes 913 may be used to quickly locate data without having to search every row in the geographic database 101 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 101 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 907. The geographic database 101 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 101 can also persistence filter data records 909 for data used, processed, and/or generated based on a machine learning-based persistence filter 105. The data can include but is not limited to machine learning model parameters, architectures, training data, trained stated, detected features, feature observations, associated sensor data, etc. The persistence filter data records 909 can also store confidence or existence/absence probability determinations for features of interest. By way of example, the persistence filter data records 909 can be associated with one or more of the node records 903, road segment records 905, and/or POI data records 907 to support uses cases such as enhanced mapping UIs, autonomous driving, dynamic map updates, etc. In one embodiment, the persistence filter data records 909 and/or associated map update data are stored as a data layer of the hierarchical tile-based structure of the geographic database 101 according to the various embodiments described herein.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1111.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 101 can be maintained by the content provider 131 in association with the services platform 127 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle (e.g., vehicle 103 and/or UE 133) along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 103 or UE 133. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a machine learning-based persistence filter may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
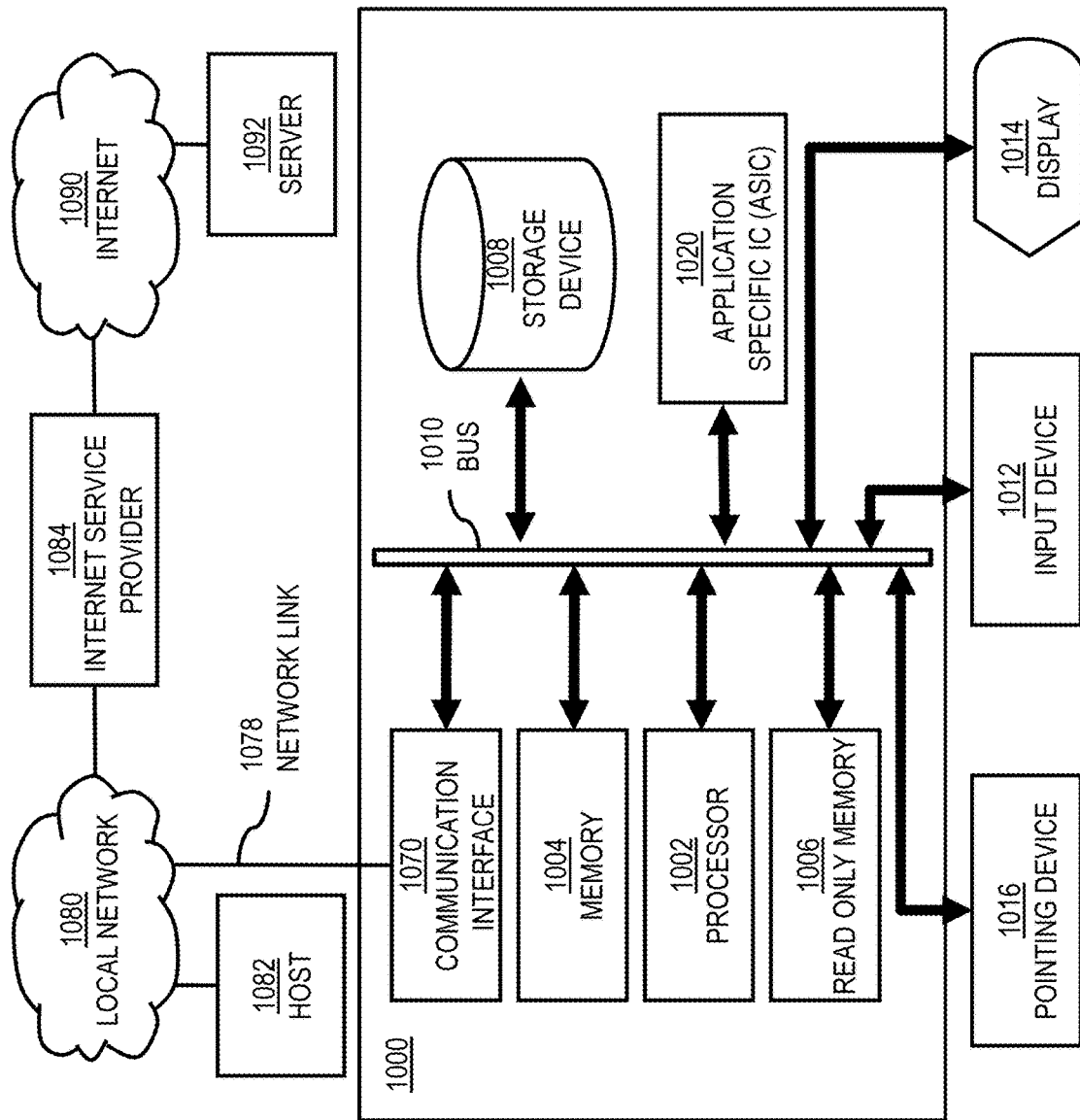
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to provide a machine learning-based persistence filter as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing a machine learning-based persistence filter. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing a machine learning-based persistence filter. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing a machine learning-based persistence filter, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners, and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic, or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 125 for providing a machine learning-based persistence filter.

The term computer-readable medium is used herein to refer to any medium that participates in providing information to processor 1002, including instructions for execution. Such a medium may take many forms, including, but not limited to, non-volatile media, volatile media, and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to provide a machine learning-based persistence filter as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide a machine learning-based persistence filter. The memory 1105 also stores the data associated with or generated by the execution of the inventive steps.

Figure 12:
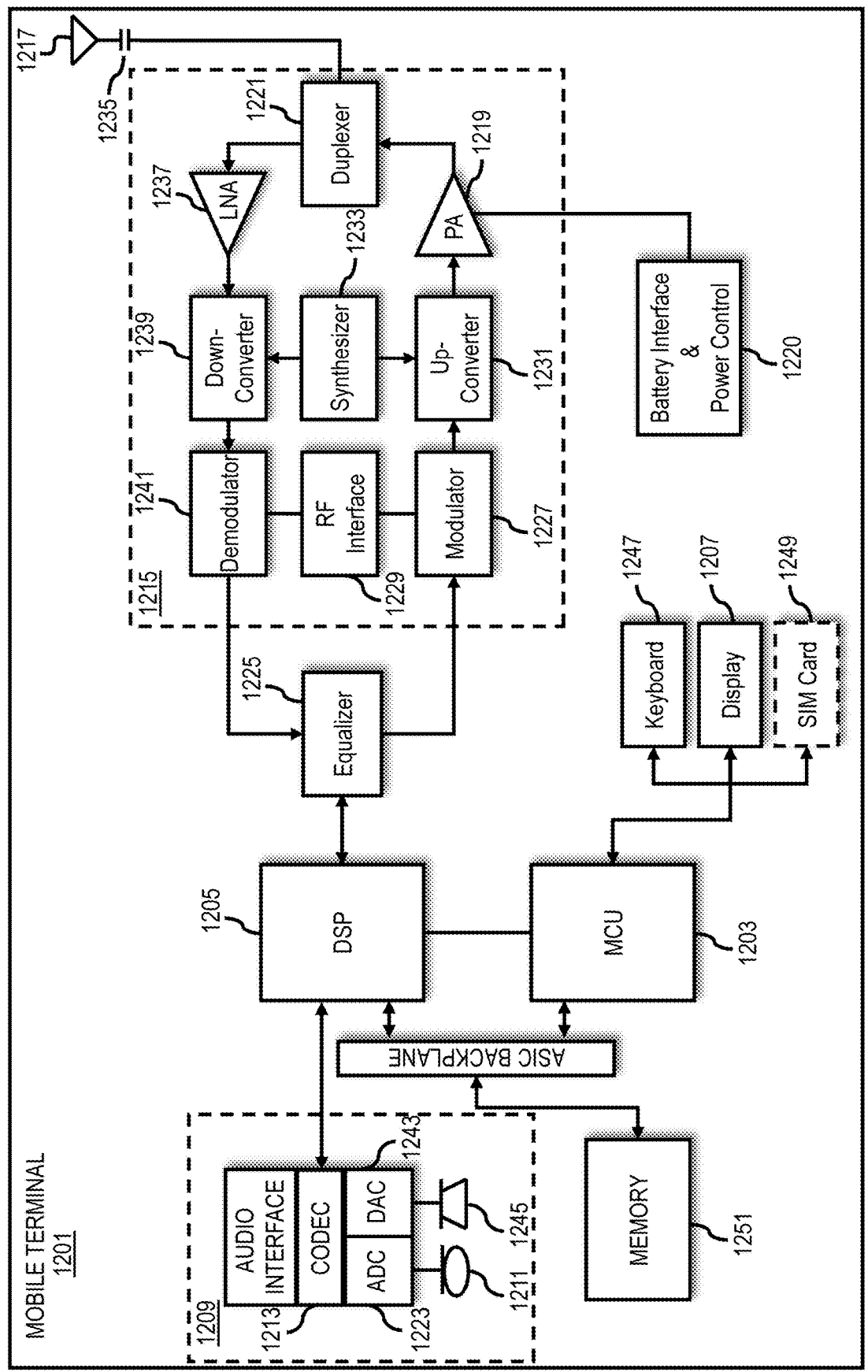
FIG. 12 is a diagram of a mobile terminal (e.g., handset or other mobile device, like a vehicle or part thereof) that can be used to implement an embodiment.

FIG. 12 is a diagram of exemplary components of a mobile terminal (e.g., a UE 133, vehicle 103, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide a machine learning-based persistence filter. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RANI memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
processing sensor data collected from a plurality of vehicles to determine one or more positive observations, one or more negative observations, or a combination thereof of a geographic feature, wherein the one or more positive observations are based on determining that sensor data collected from one or more sensors of the plurality of vehicles indicates a presence of the geographic feature, and wherein the one or more negative observations are based on determining that the sensor data indicates an absence of the geographic feature;
providing the one or more positive observations, the one or more negative observations, or a combination thereof as an input sequence to a machine learning model, wherein the machine learning model includes a persistence filter that functions independently of a predetermined prior probability value, wherein the input sequence is a representation of the sensor data collected from the plurality of vehicles as a time-ordered sequence of binary values, wherein the machine learning model includes an input layer that feeds the input sequence to a long short term memory (LSTM) layer, wherein the LSTM layer connects to a fully connected layer and then to an output layer, and wherein the output layer outputs a predicted sequence of the one or more positive observations, the one or more negative observations, or a combination thereof as a function of the entire time-ordered sequence of binary values; and
initiating an update of a geographic database to add, remove, or update the geographic feature based on the predicted sequence.

2. The method of claim 1, wherein the LSTM layer is connected to the fully connected layer through a last output of the LSTM layer from the last input of the input sequence of the input layer.

3. The method of claim 1, wherein the fully connected layer is passed through an activation layer to the output layer.

4. The method of claim 3, wherein the activation layer is a sigmoid activation layer.

5. The method of claim 1, wherein an input node of the input layer feeds an observation value in the input sequence to the machine learning model to determine a predicted observation value and a posterior probability associated with the predicted observation value; and wherein a next observation value in the input sequence is processed using the machine learning model based, at least in part, on the predicted observation value and the posterior probability.

6. The method of claim 5, wherein the machine learning model includes a Softmax layer, and wherein the Softmax layer is used to determine the posterior probability.

7. The method of claim 5, wherein a subsequent next observation value in the input sequence is repeatedly processed until an end of the input sequence.

8. The method of claim 1, wherein the update of the geographic database is initiated based on a last observation value of the predicted sequence.

9. The method of claim 1, wherein the one or more positive observations and the one or more negative observations are represented as respective binary values in the input sequence.

10. An apparatus comprising:
at least one processor; and
at least one memory including computer program code for one or more programs,
the at least one memory and the computer program code configured to, with the at least one processor, cause the apparatus to perform at least the following,
  process sensor data collected from a plurality of vehicles to determine one or more positive observations, one or more negative observations, or a combination thereof of a geographic feature, wherein the one or more positive observations are based on determining that sensor data collected from one or more sensors of the plurality of vehicles indicates a presence of the geographic feature, and wherein the one or more negative observations are based on determining that the sensor data indicates an absence of the geographic feature;
  provide the one or more positive observations, the one or more negative observations, or a combination thereof as an input sequence to a machine learning model, wherein the machine learning model includes a persistence filter that functions independently of a predetermined prior probability value, wherein the input sequence is a representation of the sensor data collected from the plurality of vehicles as a time-ordered sequence of binary values, wherein the machine learning model includes an input layer that feeds the input sequence to a recurrent neural network (RNN) layer, wherein the RNN layer connects to a fully connected layer and then to an output layer, and wherein the output layer outputs a predicted sequence of the one or more positive observations, the one or more negative observations, or a combination thereof as a function of the entire time-ordered sequence of binary values; and
  initiate an update of a geographic database to add, remove, or update the geographic feature based on the predicted sequence.

11. The apparatus of claim 10, wherein the RNN layer is a long short-term memory (LSTM) layer.

12. The apparatus of claim 10, wherein the RNN layer is connected to the fully connected layer through a last output of the RNN layer from the last input of the input sequence of the input layer.

13. A non-transitory computer-readable storage medium carrying one or more sequences of one or more instructions which, when executed by one or more processors, cause an apparatus to perform:

processing sensor data collected from a plurality of vehicles to determine one or more positive observations, one or more negative observations, or a combination thereof of a geographic feature, wherein the one or more positive observations are based on determining that sensor data collected from one or more sensors of the plurality of vehicles indicates a presence of the geographic feature, and wherein the one or more negative observations are based on determining that the sensor data indicates an absence of the geographic feature;
  providing the one or more positive observations, the one or more negative observations, or a combination thereof as an input sequence to a machine learning model, wherein the machine learning model includes a persistence filter that functions independently of a predetermined prior probability value, wherein the input sequence is a representation of the sensor data collected from the plurality of vehicles as a time-ordered sequence of binary values, wherein the machine learning model includes an input layer that feeds the input sequence to a long Short Term Memory (LSTM) layer, wherein the LSTM layer connects to a fully connected layer and then to an output layer, and wherein the output layer outputs a predicted sequence of the one or more positive observations, the one or more negative observations, or a combination thereof as a function of the entire time-ordered sequence of binary values; and
  initiating an update of a geographic database to add, remove, or update the geographic feature based on the predicted sequence.

14. The non-transitory computer-readable storage medium of claim 13, wherein the LSTM layer is connected to the fully connected layer through a last output of the LSTM layer from the last input of the input sequence of the input layer.

15. The non-transitory computer-readable storage medium of claim 13, wherein the fully connected layer is passed through an activation layer to the output layer.

16. The non-transitory computer-readable storage medium of claim 13, wherein an input node of the input layer feeds an observation value in the input sequence to the machine learning model to determine a predicted observation value and a posterior probability associated with the predicted observation value; and wherein a next observation value in the input sequence is processed using the machine learning model based, at least in part, on the predicted observation value and the posterior probability.

* * * * *